United States Patent
Tang et al.

(10) Patent No.: US 11,816,932 B1
(45) Date of Patent: Nov. 14, 2023

(54) UPDATING IDENTIFICATION DATA IN AUTOMATED USER-IDENTIFICATION SYSTEMS

(71) Applicant: Amazon Technologies, Inc., Seattle, WA (US)

(72) Inventors: Zheng Tang, Redmond, WA (US); Lior Zamir, Ramat Hasharon (IL); Prithviraj Banerjee, Redmond, WA (US); Manoj Aggarwal, Seattle, WA (US); Gerard Guy Medioni, Los Angeles, CA (US); Dilip Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 17/361,811

(22) Filed: Jun. 29, 2021

(51) Int. Cl.
*G06V 40/50* (2022.01)
*G06V 40/12* (2022.01)
*G06F 18/23* (2023.01)

(52) U.S. Cl.
CPC .............. *G06V 40/50* (2022.01); *G06F 18/23* (2023.01); *G06V 40/1347* (2022.01); *G06V 40/1365* (2022.01)

(58) Field of Classification Search
CPC .... G06F 18/23; G06F 18/23213; G06F 18/24; G06F 16/35; G06F 21/32; G06F 16/906; G06N 3/08; G06N 20/00; G06N 3/45; G06V 10/82; G06V 10/762; G06V 40/172; G06V 40/1365; G06V 40/50; G06V 40/1347
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 2013/0284806 A1 | 10/2013 | Margalit | |
| 2016/0350610 A1* | 12/2016 | Yoo | ............ G06T 7/73 |
| 2019/0124079 A1* | 4/2019 | LeCun | ............ G06V 40/1312 |
| 2022/0046516 A1* | 2/2022 | Kwon | ................ H04W 40/248 |

\* cited by examiner

*Primary Examiner* — Edward F Urban
*Assistant Examiner* — Wassim Mahrouka
(74) *Attorney, Agent, or Firm* — Lee & Hayes, P.C.

(57) ABSTRACT

This disclosure describes techniques for identifying users that are enrolled for use of a user-recognition system and updating identification data of these users over time. To enroll in the user-recognition system, the user may initially scan his or her palm. The resulting image data may later be used when the user requests to be identified by the system by again scanning his or her palm. However, because the characteristics of user palms may change over the time, the user-recognition system may periodically perform processes for updating the identification data stored in association with the user in order to maintain or increase an accuracy of the user-recognition system.

20 Claims, 13 Drawing Sheets

UPDATING IDENTIFICATION DATA IN AUTOMATED USER-IDENTIFICATION SYSTEMS

BACKGROUND

As the use of computing devices continues to proliferate, so too does the manner in which these computing devices identify and/or authenticate users. For instance, users often authenticate with a computing device by typing in a username/password combination, providing biometric data (e.g., fingerprint scan, etc.), answering one or more questions known the user, or the like. In instances of biometric information, however, the underlying information may change over time as, for instance, the user ages. Thus, it may be desirable to update identification data over time to maintain or increase a level of accuracy of an identification system.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
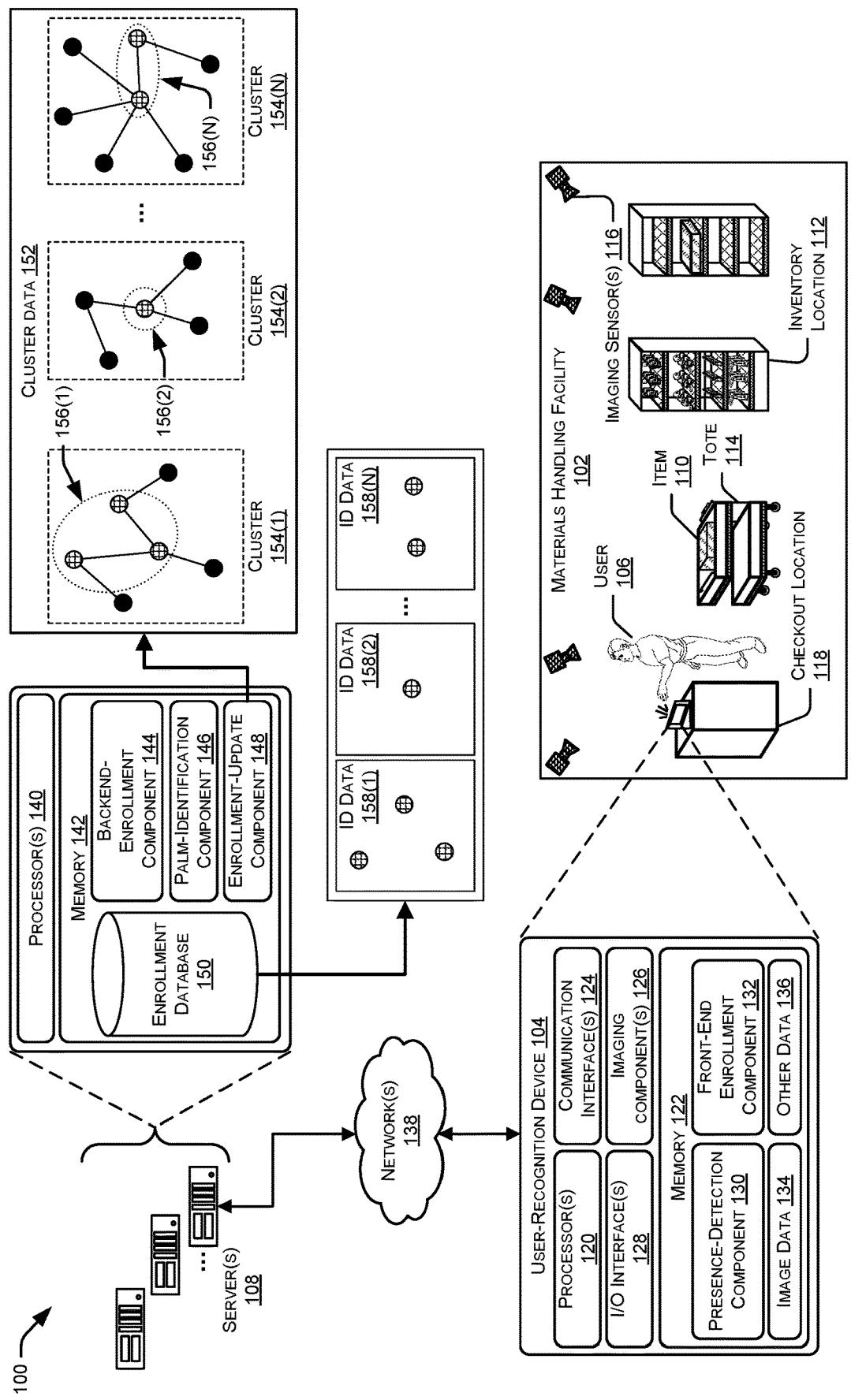
FIG. 1 illustrates an example environment that includes a user-recognition device in communication with one or more services, which collectively form a user-recognition system in which a user may enroll in the system and later be identified via the system. In this example, the user-recognition device generates image data corresponding to a palm of the user and sends the image data to one or more servers to enroll the user in the user-recognition system. In addition, the servers may update the enrollment of the user over time to reflect potential changes in characteristics of the user's palm over time.

This disclosure describes systems and techniques for identifying users using biometric-recognition techniques. As described below, users may enroll with a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of a user-recognition device located in the facility, speaking a predefined utterance to the device, or the like in order to be identified by the user-recognition system.

To utilize the user-recognition system, a user may request to be enrolled by interacting with a user-recognition device positioned in a facility. For example, the user may select an enroll option on a display of the user-recognition device, issue a voice or GUI-based command requesting to be enrolled, insert a user ID card into the user-recognition device, and/or simply present their hand or palm before the user-recognition device to prompt the enrollment process.

Upon requesting to be enrolled in the user-recognition system, the user-recognition device may, with permission and/or upon explicit request by the user, begin collecting various types of biometric data, and/or other data, for the user. For example, the user-recognition device may include one or more imaging sensors (e.g., a camera) that begins capturing image data (e.g., an individual image, a sequence of images, a video, etc.) of at least a portion of the user, such as a palm of the user, a face of the user, or the like. In the example of the palm, the user-recognition device may request that the user move their hand to different angles and/or orientations as the device captures the image data and may also capture image data under different lighting conditions (e.g., no flash, flash, different light polarizations, etc.), to generate image data representing the palm of the user under different environmental conditions.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, login with his or her login credentials, and so forth. Alternatively, the user may sign up for an account with the inventory-management system, and create a corresponding user profile, at the time of enrollment.

Once the user-recognition device has obtained the image data representing the palm or other potion of the user, the user-recognition device may utilize this data to enroll the user with the user-recognition system. In some examples, the user-recognition system may be implemented entirely on the user-recognition device, which may include the software, firmware, and/or hardware components to implement the techniques described herein. However, in some examples, the user-recognition system may be implemented according to a split architecture where the user-recognition device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the user-recognition device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent biometric characteristics or information that is potentially unique to the palm of the user, such as the pattern of creases in the user's palm, the pattern of veins of the user's palm, the geometry of one or more portions of the user's hand (e.g., finger sizes/shape, palm size/shape, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the user-recognition system may store the feature data in an enrollment database and associate the feature data with a user profile for that specific user. In this way, when subsequent image data is received for a user at a user-recognition device, the feature data stored in the enrollment database may be compared with the feature data generated from the subsequent image data to identify a user profile for the user represented in the subsequent image data and/or audio data. As such, the feature data stored in the enrollment database may be deemed "identification data", in that it is used to compare against subsequent feature data generated based on image data (or audio data) generated at a time when the user is requesting identification and/or authentication.

In this way, the user may be enrolled for use of the user-recognition system such that, after completing subsequent shopping sessions, the user may checkout by placing his or her palm over an imaging component of a user-recognition device to allow the user-recognition system to automatically recognize the user. The user-recognition device may detect the presence of the user (e.g., detect the palm, detect a face, detect the speech utterance, detect a touch input via a touch display, etc.), and begin streaming image data and/or audio data to the backend devices of the user-recognition system. The backend devices of the user-recognition system may then utilize the trained model(s) to extract feature data and compare that feature data to stored feature data ("identification data") for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

In some instances, the look and/or makeup of user palms may change over time (e.g., due to callouses, scars, etc.) and, thus, the palm-feature data associated with respective user profiles may need to be updated over time to allow for accurate identification. Further, in some instances the palm-feature data or other biometric-based data stored by the user-recognition system may need to be removed from the system after a threshold amount of time after generating or receiving the data to comply with regulatory requirements. Thus, the user-recognition system may again update the palm-feature data over time to allow older data to be removed while still enabling the system to identify the respective users. Furthermore, in some instances image data generated during identification attempts may be of great quality, and thus of better use in future identification attempts, than current identification data. For these and/or other reasons, the user-recognition system may update users' respective identification data over time.

In some instances, to maintain an accurate and/or current representation of the palm of the user, the user-recognition system may update the palm-feature data using image data, such as recently obtained image data, of the user. In some instances, the user-recognition system may collect and store image data for each occurrence of the user utilizing the user-recognition system, and periodically (e.g., every three months, every six months, etc.) utilize at least a portion of those images to update the palm-feature data stored in the enrollment database for the user. In some examples, the user-recognition system may update the palm-feature data upon detecting a significant change in the features of the palm of the user. By updating the palm-feature data using image data that is more recently obtained, the user-recognition system may maintain a more accurate representation of the enrolled users in order to more accurately identify enrolled users over time.

In some instances, the user-recognition system may store, for an individual user, multiple pieces of image data or palm-feature data corresponding to image data captured at different points in time. For instance, when a specific user first enrolls with the user-recognition system, the system may store, as identification data in association with a profile of the user, at least one of the image data of the user's palm and/or palm-feature data generated based on the image data. Therefore, when the user returns to a facility that utilizes the user-recognition system for identification and provides image data of the palm of the user, the palm-feature data generated using this new image data may be compared to the stored palm-feature data (i.e., the identification data) to determine when the user at the facility corresponds to the user associated with the profile. It is to be appreciated that this new palm-feature data may be compared to palm-feature data associated with multiple different user profiles for identifying the user.

Upon identifying the user by determining that the new palm-feature data corresponds to stored palm-feature data associated with a particular user profile, the user-recognition service may determine that the user at the facility corresponds to the user associated with the particular user profile. In addition to making this identification, however, the user-recognition may also store this new image data and/or the palm-feature data generated from this new image data in association with the user profile for later use in again identifying the user.

Therefore, envision that the same user again visits this facility or a different facility at still a later date. Upon the user scanning his or her palm using the user-recognition device at the facility, the user-recognition system may attempt to identify the user with reference to both the initial palm-feature data and the more-recent palm-feature data generated from the image data taken at the user's last visit to the (same or different) facility. Therefore, the user-recognition system may compare the newest palm-feature data to richer feature data, thus increasing the accuracy of the resulting recognition. Again, it is to be appreciated that the user-recognition may continue to update the identification data (e.g., palm-feature data) for each of multiple user profiles, such that the most-recently generated palm-feature data is compared to rich data across multiple different profiles.

In addition, the user-recognition system may remove older palm-feature data as the system continues to add most-recent feature data as identification data associated with a user profile. Continuing the example from above where the user initially enrolled with the system at a first time and thereafter visited the same or a different facility associated with the user-recognition system two times, the initial palm-feature data may be removed from the identification data associated with the corresponding user profile. Instead, the palm-feature data associated with the most recent two visits to the facilitie(s) may now be stored as the identification data for the user. Of course, while the above example describes removing the initially provided palm-feature data, in some instances the user-recognition system may employ weighting techniques with a sliding window to lessen the affect that older feature data has relative to newer feature data in terms of identifying users. Stated otherwise, the user-recognition may employ decay functions that cause the impact of older feature data on user recognition to decay over time.

In addition, or in the alternative, to the above, the user-recognition may periodically (e.g., nightly, weekly, etc.) update users' identification data. For instance, the user-recognition system may periodically analyze stored feature data relative to each other stored feature data to determine the similarity therebetween. The system may then use this analysis to select certain feature data to store as identification data for a particular user profile or account. Further, the system may make a similar selection for each user profile or account enrolled in the system.

To provide an example, the user-recognition system may store feature data based on image data generated at users' times of enrollment, as well as feature data based on image data captured during recognition attempts. That is, the system may store both the initial or current identification data for each user account, as well as the feature data generated from image data captured during operation of the system, such as users scanning their palms in order to be recognized by the system. At some periodicity, or in response to another trigger event, the user-recognition system may perform a process to determine whether to update identification data currently stored in association with one or more user accounts.

To begin, the user-recognition system may apply a clustering algorithm to each stored feature data. For instance, each feature data, whether generated based on image data generated at a time of enrollment or during a recognition attempt, may be considered an individual node. Then, the system may apply a clustering algorithm to generate individual clusters of nodes, with each cluster corresponding to an individual user account (and, thus, palm of an individual user). For instance, the clustering algorithm may function by comparing each "node" currently stored in the system to each other node stored in the system to determine a similarity score therebetween. For instance, first feature data may be compared to second feature data to compute a first similarity score between the first and second feature data, to third feature data to compute a second similarity score between the first and third feature data, and so forth. That is, a mathematical distance between two feature data may be computed, and each distance may be stored as a representation of a similarity between the two feature vector. Thus, each node may be compared to each other node, and each pair of nodes may be associated with a similarity score.

The user-recognition system may then compare each similarity score to a similarity-score criteria to identify those scores that satisfy the criteria (e.g., those that are greater than a threshold or otherwise indicate that they have a degree of similarity that is greater than a predefined level of similarity). Each pair of nodes having a similarity score that is greater than a threshold may be deemed connected to one another in graph data generated as a result of the clustering algorithm. Thus, as will appreciated, the clustering algorithm may output graph data that indicates multiple clusters, with each cluster being associated with a particular user profile. That is, given that each node represents a palm or other portion of a real user, most or all nodes in the system will naturally connect to other nodes that are associated with the same palm/user. Further, given that a subset of the nodes corresponding to identification data that are associated with respective user profile, each cluster itself may be deemed associated with a user profile to which the identification-data node(s) form a part of. That is, given a first node associated with a first user profile, each node coupled, directly or indirectly, to the first node may collectively define a first cluster associated with the first user profile. Similarly, given a second node associated with a second user profile, each node coupled, directly or indirectly, to the second node may collectively define a second cluster associated with the second user profile, and so forth.

After the system generates the cluster data and identifies each cluster, the system may determine whether and/or how to update the identification for each user profile associated with a cluster. In some examples, for instance, the system may identify, for each cluster, a minimum dominating set of nodes for the cluster. As is known and will be illustrated and discussed in greater detail below, a minimum dominating set of a cluster of nodes is defined as those nodes that make up a minimum number of nodes in a cluster to which each other node in the cluster directly connects. Stated otherwise, a minimum dominating set for a graph, G=(V, E) (where V is the set of nodes in the cluster and E is the set of paired nodes connected by respective edges) is a minimum subset (D) of the total nodes in the cluster (V) that every node not in D is adjacent (or directly connected) to at least one member of D. As is also known, a domination number y(G) is this number of minimum nodes (i.e., the number of nodes, D, in the dominating set).

After identifying a minimum dominating set for each cluster of the cluster data, the user-recognition system may use some or all of the feature data (i.e., nodes) of the minimum dominating set to update the identification data for the corresponding user profile. For instance, the user-recognition system may determine that a minimum dominating set for a first cluster associated with a first user profile corresponds to three nodes. The system may use these three feature data to update the identification data. For instance, the system may select one of the feature data to comprise the new identification data, may combine these three feature data to comprise the new identification data, may combine some or all of these three feature data with the previous identification data associated with the first user profile to generate the new identification data, may store each of the three feature data as the new identification data, or the like. For instance, the user-recognition may average the three feature data together and store the averaged feature data as the new identification data. In another example, the system may average these three feature data with the existing identification data and store this averaged data as the new identification data. In still other instances, the user-recognition system may perform a weighted average of some or all of the feature data in the minimum dominating set and/or the previous identification data to generate the new identification data. For instance, the system may assign a weight to each node based on a recency associated with the generation of the node, with more recent nodes being assigned a larger weight than less recent nodes. Further, in some instances the system may store each node (e.g., all three nodes) as the new identification data and may perform multiple individual recognition attempts (e.g., three recognition attempts) upon a user requesting that a recognition process be performed. Of course, while a few examples are described, it is to be appreciated that the user-recognition system may use the nodes of the minimum dominating set and/or the previous identification data to generate new identification data for the first user profile in any other manner. Further, it is to be appreciated that the user-recognition system may perform this process for updating each identification data associated with each user profile in the user-recognition system.

In some instances, a given cluster may have multiple different minimum dominating sets. For instance, a first cluster may have a dominating set made of nodes one, two, and three, along with another dominating set made of nodes one, four, and five. In these instances, the user-recognition system may determine which dominating set to use (or multiple sets) in any number of ways. For instance, the user-recognition system may identify, for each node that is not part of a particular dominating set, which edge to a node within the dominating set has a greatest similarity relative to each other edge from that node to a node in the dominating set (if the node connects to more than one node in the dominating set). For instance, the system may identify which mathematical distance between the node and a node of the dominating set is the smallest distance, representing a higher similarity. The system may perform this for each node in the dominating-set configuration to determine an overall score (e.g., a summed distance). The system may perform this process for each dominating-set configuration and may compare the computed overall scores to determine the highest similarity. For instance, the system may compare a first summed distance associated with a first dominating-set configuration to a second summed distance associated with a second dominating-set configuration to determine which distance is less (thus, representing a greater overall level of similarity). The system may then select that the dominating set for use in generating the updated identification data. Further, while one example is described, the user-recognition system may select which of multiple dominating sets to use in any other manner.

In addition, in some instances the system may determine to store, as the new identification, a number of nodes that is less than the entirety of the selected minimum dominating set. For instance, the system may determine that a number of nodes associated with the minimum dominating set is greater than a threshold number and, therefore, may determine to select a subset of these nodes. In these instances, the system may, for instance, determine, for each node, a number of other nodes that the respective node is connected and may select those nodes having the most connections. For instance, envision that a minimum dominating set of nodes for a particular cluster comprises ten nodes, which is greater than a predefined maximum number of nodes of five (for example). The system may determine which five nodes have the most individual number of connections to other nodes and may store these five nodes as the new identification data. Of course, while one criteria is discussed for selecting a sub-sample of nodes for storing as the new identification data, other criteria may additionally or alternatively be used.

Further, while the above example describes using a dominating set of a cluster to update identification data associated with a profile, it is to be appreciated that the techniques may update the identification data based on the clustering in any other manner. For instance, the techniques may update the identification data for a given cluster by averaging feature data of the cluster or feature data of any subset of the cluster (e.g., after removing outliers), using a centroid or other statistical value of the cluster, or selecting one or more nodes of the cluster in any other manner.

In addition to updating the feature data associated with user profiles over time, in some instances the user-recognition system may perform periodic or continuous audits of the system to identify potential matching errors, to correct the errors, and to retrain the system for increased future accuracy. For example, in some instances the user-recognition system may employ a first level of matching in order to identify a user upon a user entering a facility and scanning his or her palm. This first level of matching may be performed locally at the user-recognition device or at one or more network-based devices associated with the user-recognition system. Regardless, after making an initial determination of the user based on the first level of matching, the user-recognition system may employ a second, more advanced level of matching at a later time. That is, the system may use additional computing resources to cross-match the newly generated palm-feature data against even more stored palm-feature data. If the system identifies an error, the system may correct the error and use information regarding the error and the correct match to retrain one or more trained models used by the system.

To provide an example, envision that a user enters a facility and scans his or her palm. Upon generating palm-feature data associated with image data of the palm, the user-recognition system may compare this feature data to, for example, a single piece of palm-feature data associated with a first user profile, a single piece of palm-feature data associated with a second user profile, and so forth. Envision that, based on this analysis, the user-recognition determines that the user corresponds to the first user profile. Thus, the system may store an indication that any transaction that occurs within the facility by the user is to be associated with the first user profile.

At a later time, however, the system may perform a deeper analysis. For example, the user-recognition system may compare the palm-feature data of the user with multiple pieces of palm-feature data associated with the first user profile, multiple pieces of palm-feature data associated with the second user profile, and so forth. Thereafter, the user-recognition system may determine that the palm-feature data actually corresponds to the second user profile rather than the first user profile. As such, the user-recognition system may store an association between the palm feature data and the second user profile and may remove the association between the palm feature data and the first user profile. The user-recognition system may also use the information associated with the initial error and the information associated with the new match to retrain one or more trained models employed for user identification. In some instances, the system may utilize the clustering techniques described herein for identifying these errors.

In some instances, the user-recognition system may utilize different types of biometric and/or other types of information for identifying users. For example, a user may provide palm data, facial-recognition data, voice data, user ID/password data, and/or any other type of information that may be used to identify the user. To provide an example, a user may initially enroll with the user-recognition system may, for example, provide an image of a palm of the user. The system may associate the resulting feature data with an account of the user. In addition, the user may later provide additional information, such as facial-recognition data, which may also be associated with the user account. Therefore, when the user later requests that the user-recognition system identify the user, the user may scan his or her palm, provide an image of his or her face, and/or the like. The user-recognition system may then use whichever type or types of information that is provided to identify the user. Furthermore, as the user continues to engage with the user-recognition system over time, the user-recognition may continue to update identification data associated with the user as described below, potentially to include additional types of biometric data provided by the user over time.

In some instances, the user-recognition system may perform auditing processes on a periodic basis, such as nightly, weekly, or the like. In addition, or in the alternative, the user-recognition system may perform auditing processes in response to receiving user feedback, such as in response to a user indicating that he or she objects to a transaction or a match determined by the system. In still other instances, the system may perform auditing processes in response to a user being identified more or less than a threshold number of times within a certain amount of time, in response to a large transaction, in response to a transaction associated with a large number of items, in response to learning additional information regarding a user (e.g., that a user was not located at a city or state associated with a facility at which he or she was allegedly identified), or in response to occurrence of any other predefined event. In some instances, after receiving user feedback (e.g., in the form of a user indicating that he or she objects to a transaction or a match determined by the system), the user-recognition system may perform a higher level of analysis to determine whether image data associated with the transaction was misidentified. In some instances, if the system is unable to confirm with a threshold level of confidence whether it was or was not misidentified, then the user-recognition system may send the image data (potentially along with other relevant data) to a computing device associated with a human associate for analysis by the human associate. The human associate may visually compare the image data to image data associated with the user in question and, potentially other users, to determine whether the image data was misidentified.

Further, while the above example describes an example where the user-recognition system corrects an error, potentially in response to user feedback, in other instances the user-recognition system may confirm its original conclusion. For example, envision that a user states that he or she was charged for a transaction that he or she did not participate in. In response, the user-recognition system may perform a rich auditing process by comparing the palm-feature data associated with the visit in question to a large amount of palm-feature data associated with a user profile of that user and with other user profiles. Rather than identify an error, in some instances the user-recognition system may confirm the initial identification and, thus, the feedback from the user indicating he or she did not participate in the transaction may be deemed fraudulent. Again, regardless of the triggering event resulting in the audit process, in some instances the system may utilize the clustering techniques described herein for identifying these errors. That is, the system may apply a clustering algorithm to the stored feature data to identifying recognition errors that occurred during the initial recognition process. This may be used both to correct and log the error, as well as to retrain the system.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations. For instance, the described techniques for utilizing biometric data for identifying users upon their explicit request, as well as the clustering techniques for generating and updating identification data within these systems, may be utilized in an array of environments for an array of purposes. For instance, these techniques may be utilized for identifying users upon entry to an environment (e.g., upon entry to a secure area of an environment), identifying users requesting to utilize equipment or other physical apparatuses, identifying users at kiosks or other locations, and/or any other type of environment where users may request to be identified and/or authenticated.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes a user-recognition device 104 to determine that a user would like to enroll for use of a user-recognition system. In this example, the user-recognition device 104 generates image data depicting a palm of a user 106 and sends the image data to one or more backend servers 108 to be used to enroll the user for use of the user-recognition system. Generally, the user-recognition system may include the user-recognition device 104 and/or the server(s) 108.

In some instances, some or all of the user-recognition system resides remotely from the materials handling facility 102, while in other instances some or all of the user-recognition system resides within or proximate to the materials handling facility 102. As FIG. 1 depicts, the user 106 may have engaged in, or be about to engage in, a shopping session in the materials handling facility 102. For instance, the user 106 may have selected an item 110 from an inventory location 112 (e.g., shelf, aisle, etc.) and placed the item 110 in a tote 114 (e.g., shopping cart). The inventory location 112 may house one or more different types of items 110 and the user 106 may pick (i.e., take) one of these items 110.

As illustrated, the materials handling facility 102 (or "facility") may include one or more sensors, such as the illustrated imaging sensors 116, and/or an array of other sensors located on or near the inventory location(s) 112. In this example, the imaging sensor(s) 116 are configured to capture video data within the facility 102 for use in determining results associated with events, such as the picking of the item 110 by the user 106. While FIG. 1 illustrates various example sensors, the sensors in the facility 102 may comprise any other type of sensor, such as weight sensors (e.g., load cells), microphones, and/or the like, as described in detail below. As described in more detail with respect to FIGS. 10 and 11, the facility 102 may be monitored and/or otherwise associated with an inventory-management system configured to determine events in the facility 102 associated with the user 106, such as taking items 110 that the user 106 would like to purchase. The inventory-management system may track the items 110 selected by the user 106 and maintain a virtual shopping cart which includes all of the items 110 taken by the user 106. Thus, when a user 106 would like to leave the facility 102 with the items 110 they have taken, the inventory-management system may charge a user account associated with the user 106 for the cost of the items 110 that were taken.

As shown in FIG. 1, the user 106 may approach a checkout location 118 associated with the user-recognition device 104. The user 106 may determine that they would like to enroll for use of a user-recognition system in order to checkout of the facility 102 and pay for their item(s) 110. Alternatively, or additionally, the user may interact with the user-recognition device 104 upon entering the facility 102. In either instance, the user 106 may determine that they would like the user-recognition system to collect data that is usable to identify an account or profile of the user 106. This data may be utilized by the user-recognition system such that, once enrolled, the user 106 need only scan his or her palm to be identified by the user-recognition system in order to charge their user account with the purchase of their item(s) 110.

As illustrated, the user-recognition device 104 may comprise one or more processors 120 configured to power components of the device 104 and may further include memory 122 which stores components that are at least partially executable by the processor(s) 120, as well as other data. For example, the memory 122 may include a presence-detection component 130 to detect the presence of a user 106 and a front-end enrollment component 132 configured to perform various operations for enrolling the user 106 for use of the user-recognition system. The front-end enrollment component 132 may receive a request to enroll the user 106 for use of the user-recognition system. The request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

In some examples, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a palm of the user 106 over or proximate to the user-recognition device 104. Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130 at 144. In some examples, the trigger detection at 144 may not be performed, or may be included in or the same as receiving the request to enroll.

After receiving the request to enroll from the user 106, the front-end enrollment component 132 may, begin generating image data 134 using one or more imaging component(s) 126 (e.g., cameras). For instance, the front-end enrollment component 132 may utilize the imaging component(s) 126 to obtain image data 134 such as an image or picture, a sequence of consecutive images, and/or video data. The image data 134 may represent the palm of the user 106 and may be used to identify creases in the palm, veins in the palm, geometric information regarding the palm and other parts of the hand or the user 106 and/or the like. Once the front-end enrollment component 132 has obtained the image data 134 representing the palm or other portion of the user 106, the user-recognition device 104 may send (e.g., upload, stream, etc.) the image data 134 to the servers 108 over one or more networks 138 using one or more communication interfaces 124.

The network(s) 138 may include private networks such as an institutional or personal intranet, public networks such as the Internet, or a combination thereof. The network(s) 138 may utilize wired technologies (e.g., wires, fiber optic cable, and so forth), wireless technologies (e.g., radio frequency, infrared, acoustic, optical, and so forth), or other connection technologies. The network(s) 138 is representative of any type of communication network, including one or more of data networks or voice networks. The network(s) 138 may be implemented using wired infrastructure (e.g., copper cable, fiber optic cable, and so forth), a wireless infrastructure (e.g., cellular, microwave, satellite, etc.), or other connection technologies.

The communication interface(s) 124 may include devices configured to couple to personal area networks (PANs), wired and wireless local area networks (LANs), wired and wireless wide area networks (WANs), and so forth. For example, the communication interfaces 124 may include devices compatible with Ethernet, Wi-Fi™, and so forth. In some examples, the communication interface(s) 124 may encode the image data 134 and/or other data 136 generated by the user-recognition device 104 prior to sending over the network(s) 138 according to the type of protocol or standard being used.

As illustrated, the servers 108 may comprise one or more processors 140 and memory 142, which may store a back-end-enrollment component 144, a palm-identification component 146, an enrollment-update component 148, and an enrollment database 150. While certain functionality of these components are introduced here, further detail regarding these components is described with reference to FIG. 3.

Upon receiving the image data 134 from the user-recognition device 104, one or more components of the back-end servers 108, such as the backend-enrollment component 144 or the palm-identification component 146, may generate feature data using the image data. This feature data may be in a vector form and may represent characteristics about the user's palm that may be used to differentiate the palm from other user palms. It is to be appreciated that while the servers 108 are described as generating the feature data, in other instances the user-recognition device 104 may be configured to generate the feature data and may send the feature data, in addition to or rather than the image data 134, to the servers.

One or more components of the servers 108, such as the backend-enrollment component 144 or the palm-identification component 146, may store the feature data as identification data in the enrollment database 150 in association with a user profile of the user 106. That is, this palm-feature data (or "identification data") is stored such that it may be compared to feature data generated from subsequent image data for later identification of the user 106 at the facility 102 or other facilities that are associated with the user-recognition system.

After the user has enrolled in the user-recognition system, the imaging components 126 may receive additional image data of the palm of the user 106 and/or of palms of users of the system, such as at a time when the user 106 or other users return to the facility 102 at a later date. After the servers 108 receive the additional image data from the user-recognition device 104, the palm-identification component 146 or other components(s) of the servers 108 may generate additional feature data based on the additional image data. At this point, one or more components of the servers 108, such as the palm-identification component 146, may compare the additional feature data to feature data stored in respective user profiles for the purpose of identifying the user associated with the additional image data. For example, the user-recognition system may compare the additional feature data generated with the identification data stored in association with the user profile of the user 106 to determine that the additional image data corresponds to the user 106. In response to determining that the additional image data corresponds to the user profile associated with the user 106, the servers 108 may store this indication and output a notification that the user has been recognized. For instance, the servers 108 may cause the user-recognition device 104 to output a visual and/or audible indication regarding the successful recognition and/or may perform additional actions, such as charge a payment instrument associated with the user profile for any items acquired from the facility 102. In addition, the servers 108 may store the additional feature data in association with the profile of the user 106 in the enrollment database 150. This additional feature data may be used to update the identification data associated with the user 106, as described below.

As introduced above, the user-recognition system may also update the identification data associated with the user 106, and other users, as stored in the enrollment database 150. The enrollment-update component 148, for instance, may be configured to periodically (e.g., nightly, weekly, etc.) update users' identification data in the enrollment database 150. For instance, the enrollment-update component 148 may periodically analyze stored feature data relative to each other stored feature data to determine the similarity therebetween. The enrollment-update component 148 may then use this analysis to select certain feature data to store as identification data for a particular user profile or account in the enrollment database 150. Further, the enrollment-update component 148 may make a similar selection for each user profile or account enrolled in the system.

In order to update the identification data associated with multiple user accounts, the enrollment-update component 148 may apply a clustering algorithm to each stored feature data to generate cluster data 152. Within the cluster data 154, each illustrated node may correspond to individual feature data, whether generated based on image data generated at a time of enrollment or during a recognition attempt. Stated otherwise, each node represents feature data associated with a time at which the user-recognition device 104 generated image data corresponding to a palm of a user of the user-recognition system.

The clustering algorithm applied by the enrollment-update component 148 may function by comparing each "node" currently stored in the enrollment database 150 to each other node stored in the enrollment database 150 to determine a similarity score therebetween. For instance, first feature data may be compared to second feature data to compute a first similarity score between the first and second feature data, to third feature data to compute a second similarity score between the first and third feature data, and so forth. That is, a mathematical distance between two feature data may be computed, and each distance may be stored as a representation of a similarity between the two feature vector. Thus, each node may be compared to each other node, and each pair of nodes may be associated with a similarity score.

The enrollment-update component 148 may then compare each similarity score to a similarity-score criteria to identify those scores that satisfy the criteria (e.g., those that are greater than a threshold or otherwise indicate that they have a degree of similarity that is greater than a predefined level of similarity). Each pair of nodes having a similarity score that is greater than a threshold may be deemed connected to one another in graph data generated as a result of the clustering algorithm. FIG. 1, for instance, illustrates that certain nodes may be connected, via an edge, to one or more other nodes when the similarity therebetween is greater than a similarity-score threshold.

After generating the cluster data 152, the enrollment-update component 148 may analyze the cluster data 152 to identify clusters within the data 152. FIG. 1, for instance, illustrates that the enrollment-update component 148 has identified a first cluster 154(1) consisting of six nodes, a second cluster 154(2) consisting of five nodes, and a $N^{th}$ cluster 154(N) consisting of seven nodes. As illustrated, each respective cluster is generally independent of each other cluster, given that it is unlikely that a node associated with a palm of one user will be deemed to be sufficiently similar to a node associated with a palm of another user so as to warrant an edge connection therebetween.

After identifying the different clusters 154, the enrollment-update component 148 may use one or more of the nodes (i.e., feature data) to update one or more identification data stored in the enrollment database 150. For instance, the enrollment-update component 148 may use one or more nodes from the first cluster 154(1) to update identification associated with a first user profile (e.g., associated with the illustrated user 106), one or more nodes from the second cluster 154(2) to update identification data associated with a second user profile, and so forth.

To update this identification data, the enrollment-update component 148 may identify a dominating set, such a minimum dominating set, from each cluster 154. A minimum dominating set of a cluster of nodes is defined as those nodes that make up a minimum number of nodes in a cluster to which each other node in the cluster directly connects. Stated otherwise, a minimum dominating set for a graph, G=(V, E) (where V is the set of nodes in the cluster and E is the set of paired nodes connected by respective edges) is a minimum subset (D) of the total nodes in the cluster (V) that every node not in D is adjacent (or directly connected) to at least one member of D. As is also known, a domination number y(G) is this number of minimum nodes (i.e., the number of nodes, D, in the dominating set). In the illustrated example, for instance, the enrollment-update component 148 may identify a minimum dominating set 156(1) (consisting of three nodes) for the first cluster 154(1), a minimum dominating set 156(2) (consisting of one node) for the second cluster 154(2), and a minimum dominating set 156 (N) (consisting of two nodes) for the $N^{th}$ cluster 154(N).

After identifying a minimum dominating set 156 for each cluster 154 of the cluster data 152, the enrollment-update component 148 may use some or all of the feature data (i.e., nodes) of the respective minimum dominating set to update the respective identification data for the corresponding user profile. For instance, the enrollment-update component 148 may use the three nodes from the first dominating set 156(1) to generate new identification (ID) data 158(1) associated with the first user profile, the single node from the second dominating set 156(2) to generate new identification data 158(2) associated with the second user profile, and the new nodes associated with the $N^{th}$ dominating set 156(N) to generate new identification data 158(N) associated with the $N^{th}$ user profile. Thereafter, subsequent palm-feature data generated from subsequent image data may be compared to the updated identification data 158(1)-(N) to determine which user profile corresponds to the subsequent feature data.

The enrollment-update component 148 may use the feature data associated with the dominating sets 156 to update identification data 158 in a number of ways. For instance, the enrollment-update component 148 may select one of the feature data to comprise the new identification data, may combine these feature data from the dominating to comprise the new identification data, may combine some or all of these feature data with the previous identification data associated with the respective user profile to generate the new identification data, or the like. For instance, the enrollment-update component 148 may average the three nodes from the dominating set 156(1) and store this averaged feature data as the new identification data 158(1) in association with the first user profile. In another example, the enrollment-update component 148 may average these three feature data with the existing identification data and store this averaged data as the new identification data 158(1). In still other instances, the enrollment-update component 148 may perform a weighted average of some or all of the feature data in the minimum dominating set and/or the previous identification data to generate the new identification data 158(1). For instance, the enrollment-update component 148 may assign a weight to each node based on a recency associated with the generation of the node, with more recent nodes being assigned a larger weight than less recent nodes. In still other instances, the enrollment-update component 148 may store each node as the new identification data. Of course, while a few examples are described, it is to be appreciated that the enrollment-update component 148 may use the nodes of the minimum dominating set and/or the previous identification data to generate new identification data 158(1) for the first user profile and other user profiles in any other manner.

While not illustrated in FIG. 1, in some instances, a given cluster 154 may have multiple different minimum dominating sets. For instance, a particular cluster 154 may have a dominating set made of nodes one, two, and three, along with another dominating set made of nodes one, four, and five. In these instances, the enrollment-update component 148 may determine which dominating set to use (or multiple sets) in any number of ways. For instance, the enrollment-update component 148 may identify, for each node that is not part of a particular dominating set, which edge to anode within the dominating set has a greatest similarity relative to each other edge from that node to a node in the dominating set (if the node connects to more than one node in the dominating set). For instance, the enrollment-update component 148 may identify which mathematical distance between the node and a node of the dominating set is the smallest distance, representing a higher similarity. The system may perform this for each node in the dominating-set configuration to determine an overall score (e.g., a summed distance). The enrollment-update component 148 may perform this process for each dominating-set configuration and may compare the computed overall scores to determine the highest similarity. For instance, the system may compare a first summed distance associated with a first dominating-set configuration to a second summed distance associated with a second dominating-set configuration to determine which distance is less (thus, representing a greater overall level of similarity). The enrollment-update component 148 may then select the dominating set for use in generating the updated identification data. Further, while one example is described, the enrollment-update component 148 may select which of multiple dominating sets to use in any other manner.

Further, in some instances the cluster data 152 may serve to connect one or more nodes that previously were not recognized by the system during the recognition process. For instance, envision that one of the nodes in the cluster 154(1) represents feature data generated from image data of a user palm during a failed recognition attempt. The process of generating the cluster data 152, however, may serve to associate this node with the cluster 154(1) and, thus, to the corresponding user account or profile. Thus, in addition to being used to update the identification data for individual user profiles, the clustering process may also be used to associate previously unrecognized nodes with user profiles, which may not only associate that node with the cluster/profile but may also increase the accuracy of the system. Further, in some instances when a previous unidentified node is thereafter associated with a particular cluster during the clustering process, this new association may serve as a trigger or input to cause new identification to be generated for this particular cluster. That is, given that the node was not successfully identified during the recognition process, the later associating the node with the cluster may indicate that the identification data for that particular cluster should be updated to avoid subsequent recognition failures.

Figure 2:
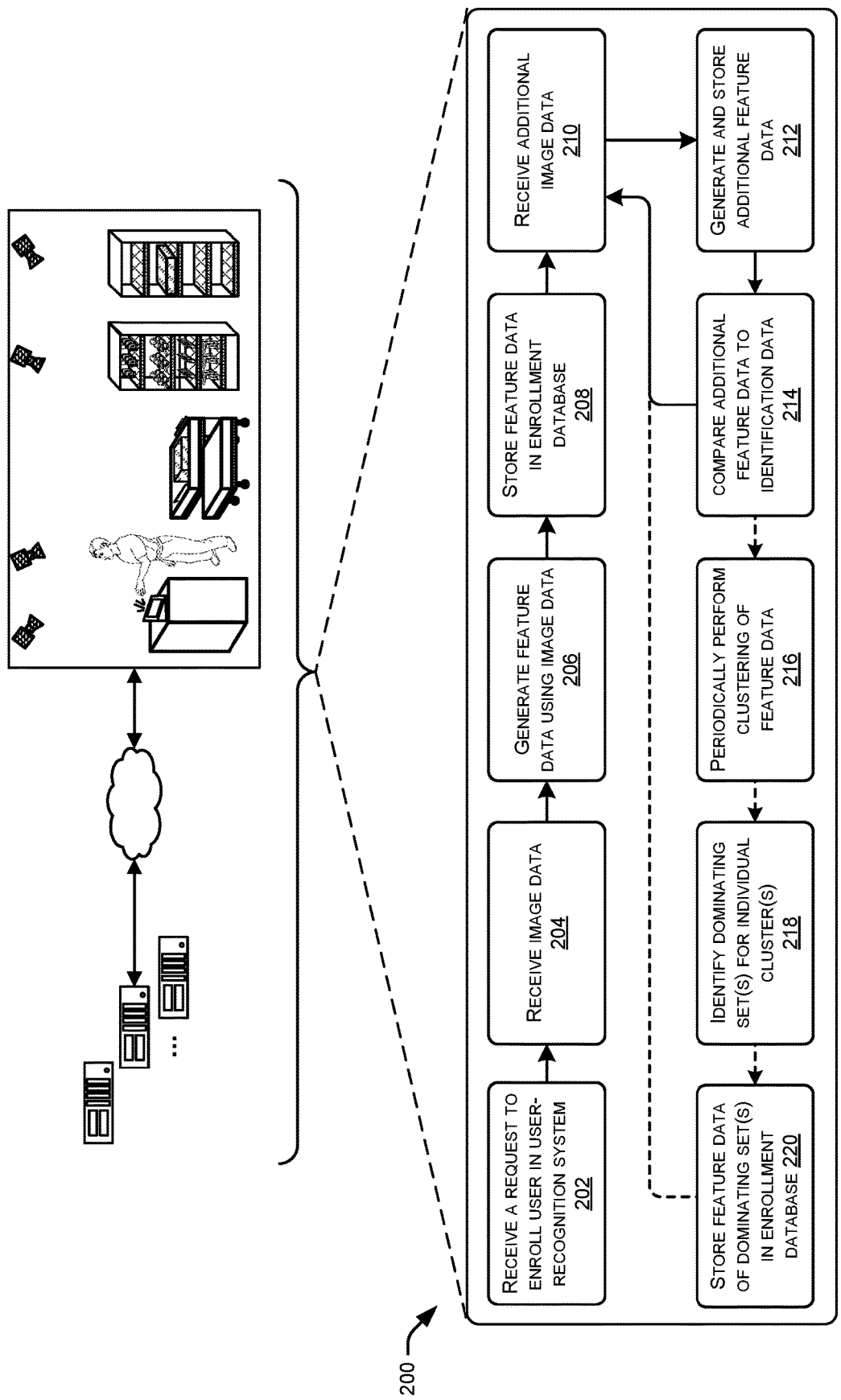
FIG. 2 illustrates an example process that the user-recognition system may implement for enrolling a user in the system, identifying the user, and periodically updating the identification data used for identifying the user.

FIG. 2 illustrates an example process 200 that the user-recognition system may implement for enrolling a user in the system, identifying the user, and periodically updating the identification data used for identifying the user. In some instances, the operations of the process 200 may be performed by the servers 108 in communication with the user-recognition device 104.

At an operation 202, the servers 108 receive a request to enroll a user in a user-recognition system. For instance, the user may operate the user-recognition device, their mobile device, or another electronic device to submit an enrollment request. At an operation 204, the servers 108 receive image data, such as image data of a palm or other portion of the user. At an operation 206, the servers 108 generate feature data using the image data. As described herein, the feature data may comprise a feature vector representing the palm of the user, such as a 128-dimension feature vector representing the palm of the user. Further, while the process 200 describes the servers 108 receiving the image data and generating the feature data therefrom, in some instances the user-recognition device may generate the feature data from the image data and provide the feature data to the servers 108.

At an operation 208, the servers 108 may store the feature data as identification data in the enrollment database 150. That is, this feature data may be stored in association with a user account or profile of the user and may be used for comparing subsequently received/generated feature data for identifying the user at the user-recognition system as part of subsequent recognition attempts. At an operation 210, for instance, the servers 108 (or the user-recognition device 104) receives additional image data and, at an operation 212, generates and stores additional feature data based on the additional image data. Again, in some instances, the user-recognition device 104 may generate the additional feature data from the additional image data and provide the additional feature data to the servers 108.

In either instance, in addition to storing the additional feature data, the servers 108 may compare the additional feature data to identification feature to attempt to identify a user account or profile that corresponds to the user that is associated with the additional feature data. For instance, the servers 108 may compare the additional feature data to the identification data stored at the operation 208, as well as to identification data associated with other user accounts or profiles. Upon identifying a match, the servers 108 may output an indication of the match and/or perform another action, such as associate a transaction with the corresponding user profile.

Further, an operation 216 represents the servers 108 periodically performing clustering of feature data stored at the servers 108. As described above, this operation may comprise applying a clustering algorithm to feature data that is stored as identification data and feature data received during recognition attempts. Further, in some instances the clustering algorithm compares each individual feature data with each other individual feature data to determine a similarity therebetween. The clustering algorithm may thereafter determine the similarity scores that meet one or more similarity criteria (indicating a relatively high level of similarity) and may store an indication of a connection between these two feature data.

An operation 218 represents identifying clusters within the resulting cluster and identifying a respective dominating set within each cluster. For instance, the servers 108 may identify "N" number of clusters and, for each cluster, may identify a minimum dominating set of nodes (or feature data) from the cluster. If a cluster has multiple minimum dominating sets, the servers 108 may select one or more of the minimum dominating sets using the techniques described above. Finally, an operation 220 represents storing feature associated with the dominating sets as identification data in the enrollment database 150. As described above, this operation may comprise replacing each of the previous identification data with the new feature data indicated in the dominating sets, merging the new feature data with the previous identification data, or the like.

Figure 3:
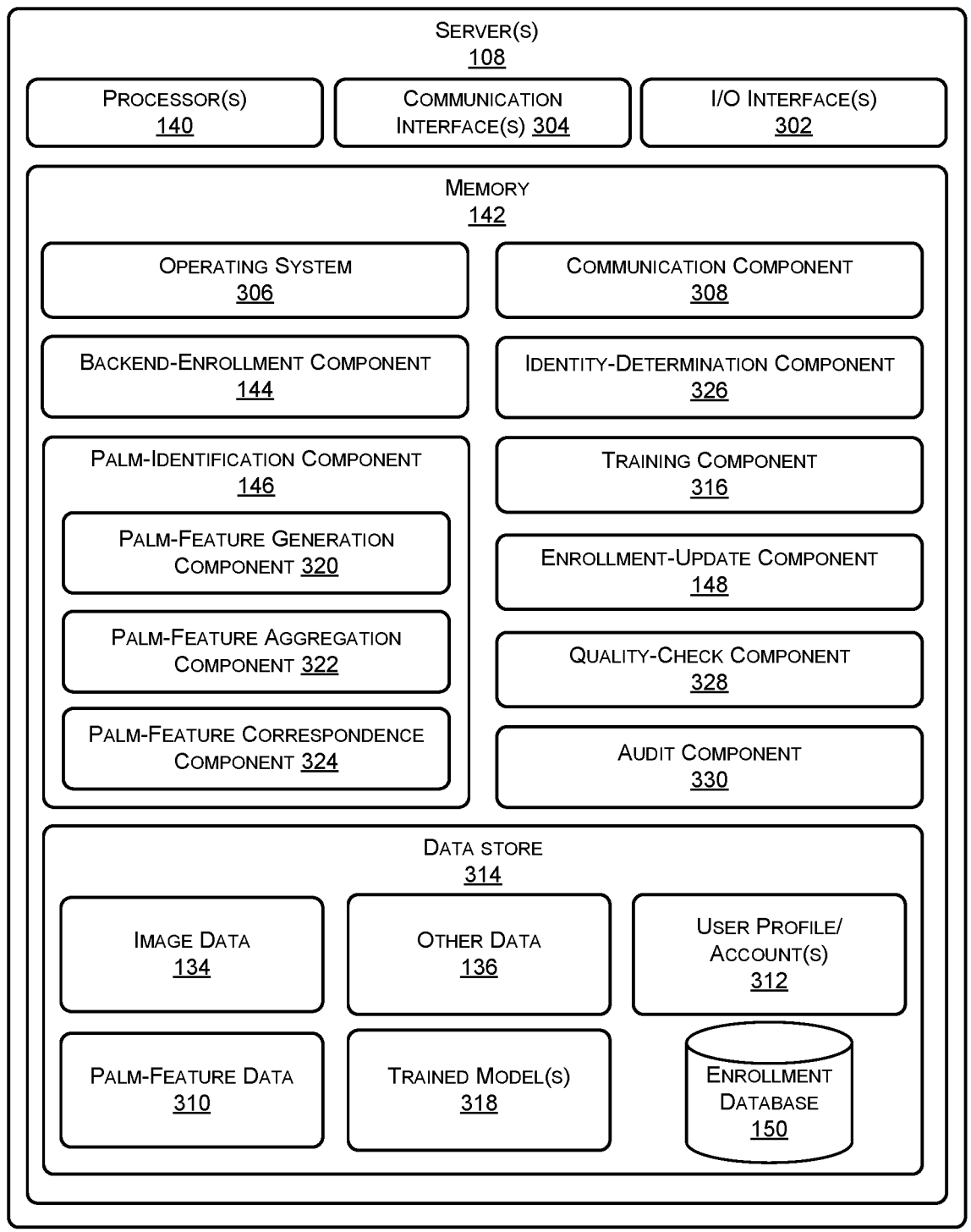
FIG. 3 illustrates example components of one or more servers configured to support at least a portion of the functionality of a user-recognition system.

FIG. 3 illustrates example components of one or more servers 108 configured to support at least a portion of the functionality of a user-recognition system. In some examples, the user-recognition system described herein may be supported entirely, or at least partially, by the user-recognition device 104 in conjunction with the servers 108. The server(s) 108 may be physically present at the facility 102, may be at a remote location accessible by the network 138, or a combination of both. The server(s) 108 do not require end-user knowledge of the physical location and configuration of the system that delivers the services. Common expressions associated with the server(s) 108 may include "on-demand computing," "software as a service (SaaS)," "cloud services," "data centers," and so forth. Services provided by the server(s) 108 may be distributed across one or more physical or virtual devices.

The server(s) 108 may include one or more hardware processors 140 (processors) configured to execute one or more stored instructions. The processors 140 may comprise one or more cores. The server(s) 108 may include one or more input/output (I/O) interface(s) 302 to allow the processor 140 or other portions of the server(s) 108 to communicate with other devices. The I/O interfaces 302 may comprise Inter-Integrated Circuit (I2C), Serial Peripheral Interface bus (SPI), Universal Serial Bus (USB) as promulgated by the USB Implementers Forum, RS-232, and so forth.

The server(s) 108 may also include one or more communication interfaces 304. The communication interfaces 304 are configured to provide communications between the server(s) 108 and other devices, such as the user-recognition device 104, the interface devices, routers, and so forth. The communication interfaces 304 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server(s) 108 may also include one or more busses or other internal communications hardware or software that allow for the transfer of data between the various modules and components of the server(s) 108.

As shown in FIG. 3, the server(s) 108 includes one or more memories 142. The memory 142 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 142 provides storage of computer-readable instructions, data structures, program modules, and other data for the operation of the server(s) 108. A few example functional modules are shown stored in the memory 142, although the same functionality may alternatively be implemented in hardware, firmware, or as a system on a chip (SOC).

The memory 142 may include at least one operating system (OS) 306. The OS 306 is configured to manage hardware resource devices such as the I/O interfaces 302, I/O devices, the communication interfaces 304, and provide various services to applications or modules executing on the processors 140. The OS 306 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 142. These modules may be executed as foreground applications, background tasks, daemons, and so forth.

A communication component 308 may be configured to establish communications with one or more of the imaging sensors 116, the user-recognition devices 104, other server(s) 108, or other devices. The communications may be authenticated, encrypted, and so forth.

A backend-enrollment component 144 may be configured to perform various operations for enrolling a user 106 for use of the user-recognition system. For instance, the backend-enrollment component 144 may perform various operations, and/or cause other components to perform various operations, to enroll users 106 in the user-recognition system. In some instance, the backend-enrollment component 144 may at least partly control a palm-identification component 146 that performs operations for analyzing image data 134 depicting a palm or other portion of the user 106. In some examples, the backend-enrollment component 144 may cause the palm-identification component 146 to analyze the image data 134 and extract features which represent a palm of the user 106, such as palm-feature data 310.

After obtaining, determining, and/or generating the palm-feature data 310, the backend-enrollment component 144 may enroll the user 106 in an enrollment database 150 which indicates that the user 106 is enrolled for use of the user-recognition system. In some examples, the backend-enrollment component 144 may associate, or map, the various data to a user profile/account 312 that is associated with the user 106. For example, the backend-enrollment component 144 may map, for each enrolled user 106, respective palm-feature data 310 to corresponding user profiles 312 in the enrollment database 150. Thus, the enrollment database 150 may store indications of user profiles 312, as well as the data for users 106 associated with each of the user profiles 312. When a user 106 is enrolled for use of the user-recognition system, the backend-enrollment component 144 may map, or store an association, between the user's 106 palm-feature data 310 with the user profile 312 for that user 106. Further, the user profile 312 may include various information for the user 106, such as payment information to perform transactions for items 110 selected by the user 106 from the facility 102. The various types of data discussed herein may be stored in a data store 314 in the memory 142 of the server(s) 108, as illustrated in FIG. 3.

Further, the backend-enrollment component 144 may cause a training component 316 to train one or more trained models 318. The training component 316 may utilize the palm-feature data 310 to train the trained model(s) 318 to perform various operations for extracting and/or generating, from the image data 134, palm-feature data 310. The trained model(s) 318 may comprise any type of model, such as machine-learning models, including but not limited to artificial neural networks, classifiers, decision trees, support vector machines, Bayesian networks, and so forth.

As a specific example, the trained model(s) 318 may include or comprise one or more convolution neural networks (CNNs), recursive neural networks, and/or any other artificial networks, that are trained to analyze image data 134 received as input, and extract, determine, identify, generate, etc., palm-feature data 310 representing biometric characteristics of a palm of the user 106. As a specific example, the palm-feature data 310 may comprise a 128-dimension feature vector representing the biometric characteristic(s) of the palm of the user 106. In examples where the trained model(s) 318 include one or more CNNs, various functions may be utilized to transform the image data 134 into a metric space, such as a triplet loss function. Thus, the training component 316 may train the CNNs of the trained model(s) 318 using various functions, such as a triplet loss function, to extract, identity, or otherwise determine palm-feature data 310 from input image data 134. Once in the metric space, extracted feature data may be compared, or matched, by computing a distance between the extracted feature data and feature data stored in the enrollment database 150. For instance, when feature data is extracted from the image data 134 into palm-feature data 310 by the trained model(s) 318, the extracted palm-feature data 310 may then be compared to stored data in the enrollment database 150 to identify a user profile for the user 106 represented in the input image data 134. For instance, the extracted palm-feature data 310 may comprise a vector that is compared with stored vectors in the enrollment database 150 to identify which stored vectors have the smallest "distance" between the extracted feature data. The smaller the distance, the closer the strength of correspondence between the extracted feature data and the stored feature data representing users 106 that are enrolled for use of the user-recognition system. In some examples, other calculations may be performed, such as finding a cosine of an angle between two vectors, depending on the network utilized by the trained model(s) 318. However, any type of models may be utilized for the trained model(s) 318.

The palm-identification component 146 may include various sub-components for performing various operations. For instance, the palm-identification component 146 may include a palm-feature generation component 320 to extract or otherwise generate feature data from the image data 134. The palm-feature generation component 320 may utilize the trained model(s) 318, and/or include algorithms, to perform any type of feature extraction method, or embedding, to analyze the image data 134 and extract the palm-feature data 310. For instance, the palm-feature generation component 320 may utilize state-of-the-art models, such as clustering, artificial neural networks, scale-invariant feature transform, edge detection, or any other type of extraction or embedding technology, to extract palm-feature data 310 from the image data 134.

The palm-identification component 146 may further include a palm-feature aggregation component 322 configured to aggregate feature data for a user 106. For instance, the palm-feature aggregation component 322 may combine palm-feature data 310 that has been extracted from a group of images depicting the user 106, such as by averaging the features in the palm-feature data 310.

Once a user 106 is enrolled for use of the user-recognition system, an identity-determination component 326 may be utilized to determine and/or verify an identity of a user 106 that interacted with a user-recognition device 104. For example, the server(s) 108 may receive image data 134 from a user-recognition device 104 and the identity-determination component 326 may be configured to determine an identity of the user 106, where the enrollment database 150 indicates the identity of the user 106 by, for example, indicating the user profile 312 that is associated with that user's identity.

The identity-determination component 326 may cause a palm-feature correspondence component 324 to perform various operations for determining or identifying a user 106 whose palm is depicted in the received image data 134. For example, the palm-feature correspondence component 324 may compare the palm-feature data 310 for the received image data 134 with palm-feature data 310 stored in the enrollment database 150 for different user profiles 312 of users 106 enrolled in the user-recognition system in order to determine user profiles 312 for one or more users 106 whose respective palm-feature data 310 correspond to the extracted palm-feature data 310. In some instances, the score calculated by the palm-feature correspondence component 324 may be compared to a threshold and, if the score is greater than the threshold, may result in identification of the user. If multiple user profiles are associated with scores that are greater than the threshold, then the user profile associated with the highest may be deemed to be associated with the image data 134 and/or further analysis may be performed to identify the appropriate user. Further, in some instances, the user-recognition system may employ set-reduction techniques to identify, based on an initial comparison, a top "N" group of user profiles 312 of users 106 whose respective palm-feature data 310 most strongly correspond to the extracted palm-feature data 310. In some examples, a single user identity/profile 312 may be determined as corresponding to the input palm-feature data 310. However, in some examples a group of top "N" candidates may be identified by the trained model(s) 318 as corresponding with a threshold amount of strength (e.g., 50% correspondence, 75% correspondence, etc.) to the extracted palm-feature data 310. A second level of deeper analysis may then be performed to identify a single user from the "N" candidates.

Further, the memory 142 may store an enrollment-update component 148 configured to update the palm-feature data 310 stored in association with user profiles to allow for removal of stale feature data and use of more recent feature data and/or to otherwise allow for the update of the identification data (e.g., palm-feature data) stored in the enrollment database 150. As introduced above, the enrollment-update component 148 may store both current identification data (e.g., palm-feature data) and palm-feature data used in recognition attempts and may periodically perform clustering techniques on this set for determining whether and/or how to update identification data for one or more of the user profiles 312. An example operation of the enrollment-update component 148 is described below with reference to FIGS. 4A-4B.

In addition, the memory 142 may store an audit component 330 configured to perform one or more auditing processes in response to occurrence of one or more predefined events. For example, the audit component 330 may perform a nightly auditing processes comprising rich comparison of palm-feature data associated with respective user profiles to one another to identify any errors previously made by the system. After identifying an error, the system may correct the error and may also use this information to further train the trained model(s) 318 utilizing techniques similar to those performed by the backend-enrollment component 144. In some instances, the audit component 330 may perform the clustering techniques described above with reference to the enrollment-update component 148 in order to identify these errors.

Additionally, the memory 142 may store a quality-check component 328 which determines an overall metric of the quality of the extracted palm-feature data 310. For instance, the quality-check component 328 may determine that additional image data 134 needs to be obtained for a user 106 for various reasons, such as a bandage or glove covering the palm of the user 106, or the like. In some examples, the quality-check component 328 may utilize a trained model(s) 318 to determine whether a feature vector is of sufficient quality and, if not, may cause the user-recognition device to request additional image data 134.

Figure 4A:
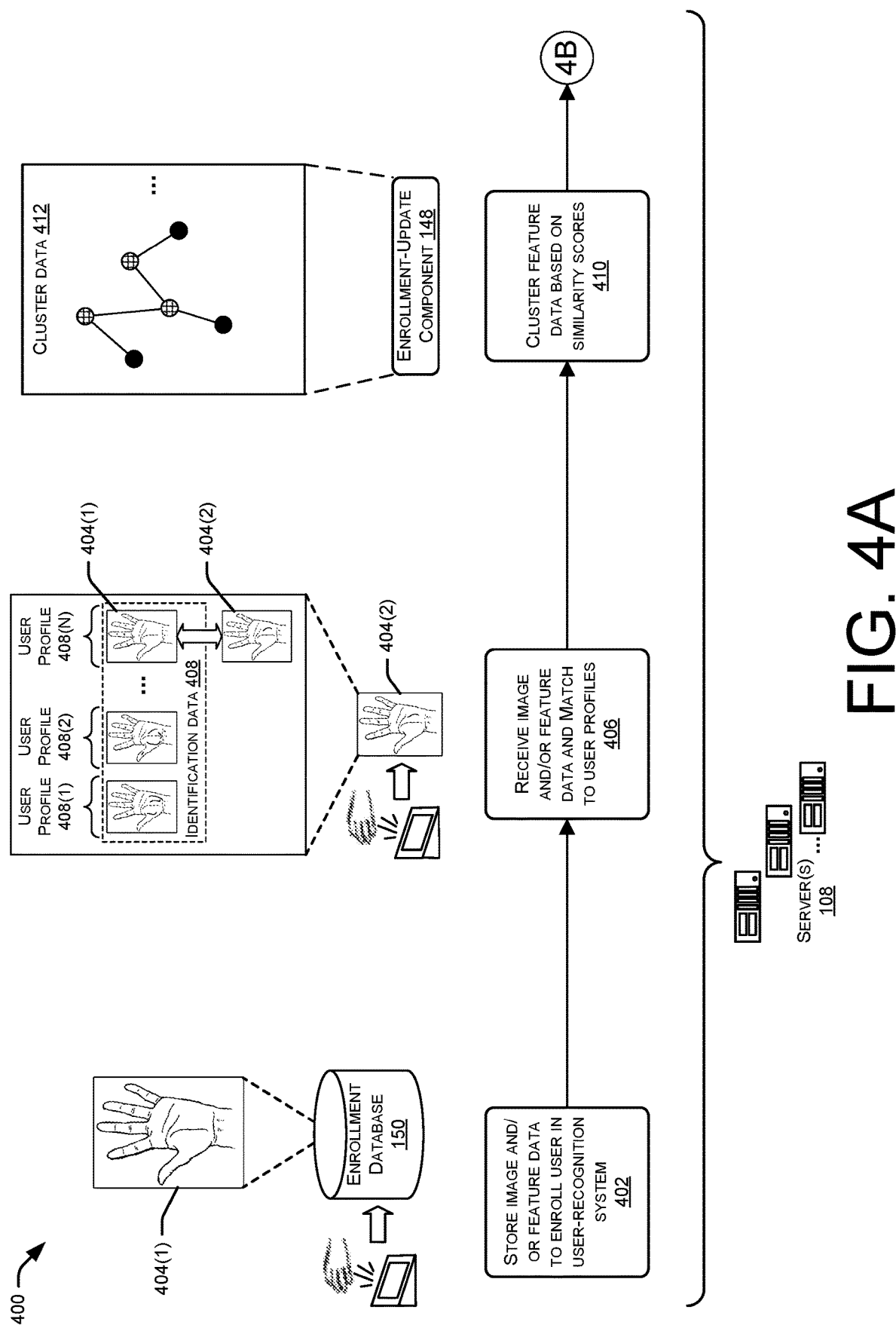
FIGS. 4A-4B collectively illustrate an example process for enrolling a user in the user-recognition system of FIG. 1, as well as identifying the user thereafter and updating the enrollment of the user over time.
Figure 4B:
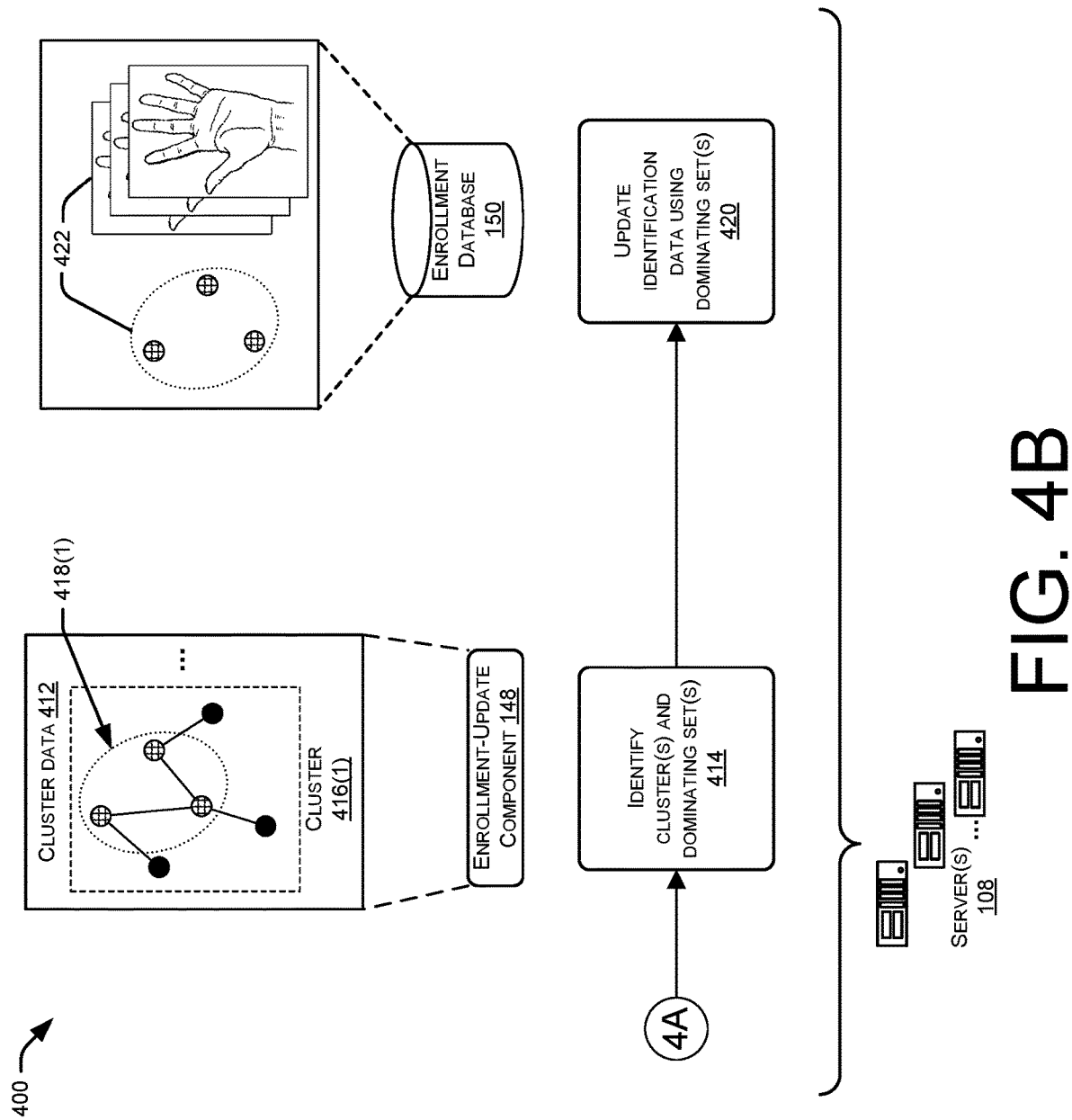

FIGS. 4A-4B collectively illustrate an example process 400 for enrolling a user in the user-recognition system of FIG. 1, as well as identifying the user thereafter and updating the enrollment of the user over time. As illustrated, in some instances the process 400 may be performed in whole or in part by one or more components accessible by the servers 108. At an operation 402, the servers 108 store image data and/or feature data generated based on the image data in an enrollment database for enrolling the user with the user-recognition system. For example, the servers may receive, from the user-recognition device 104 or another device, image data 404(1) of a palm or other portion of the user and may generate featured data (e.g., in the form of a feature vector) using the image data. The servers 108 may thereafter store the image data 404(1) and/or the feature data in the enrollment database 150 as "identification data" for a corresponding user profile. It is to be appreciated that while the illustrations depict the storing (and in some instances comparing) of image data rather than feature data, this is for ease of illustration and in other instances feature vectors or other forms of feature data may additionally or alternatively be stored and/or compared.

At an operation 406, the servers may receive additional image data 404(2) and/or corresponding feature data at a later time and may attempt to identify a user by matching the additional feature data to identification data (feature data) stored in the enrollment database 150. For example, FIG. 4A illustrates that the image data 404(2) (and/or the corresponding feature data) may be compared to image data and/or feature data associated with a first user profile 408(1), to image data and/or feature data associated with a second user profile 408(2), to image data and/or feature data associated with a "N$^{th}$" user profile 408(N), and so forth. In this example, the servers 108 determine, based on the comparison, that the image data 404(2) corresponds to the user profile 408(N) and, thus, to the corresponding user.

At an operation 410, the enrollment update component 144 performs a clustering process on the stored feature data to generate cluster data 412. As described above, the enrollment-update component 148 may perform this clustering process nightly or another periodicity, or in response to another triggering event. Further, the enrollment-update component 148 may perform this clustering process on identification data (e.g., feature data corresponding to image data 404(1)) and other feature data previously received as part of a recognition attempt (e.g., feature data corresponding to image data 404(2)).

FIG. 4B continues the illustration of the process 400 and includes, at an operation 414, the enrollment-update component 148 identifying one or more clusters in the cluster 412 and a corresponding minimum dominating set within each cluster. For instance, in this example the enrollment-update component 148 identifies a first cluster 416(1), consisting of six nodes, and a minimum dominating set 418(1), consisting of three of the six nodes. Again, each node may represent an individual feature data that has been determined to belong to the cluster 416(1).

An operation 420 concludes the process 400 and comprises the enrollment-update component 148 updating identification data in the enrollment database 150 using the dominating set(s). For instance, the enrollment-update component 148 may use one or more of the three nodes of the dominating set 418(1) to update a user profile associated with the cluster 416(1).

Figure 5:
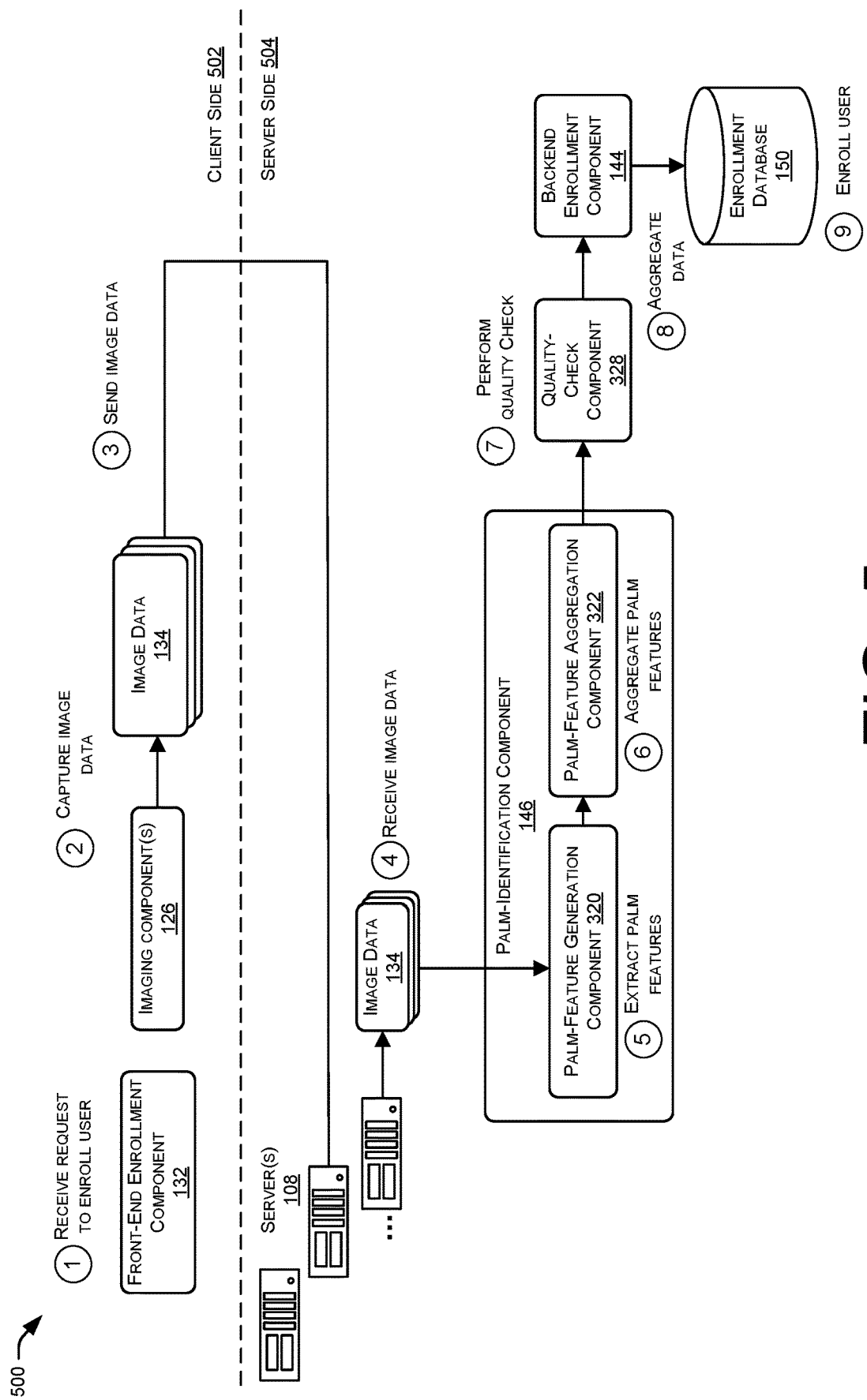
FIG. 5 illustrates an example environment including a block diagram of one or more servers configured to support at least a portion of the functionality of a user-recognition system, as well as an example flow of data within the system for enrolling a user with the user-recognition system.

FIG. 5 illustrates an example environment 500 including block diagram of one or more servers 108 configured to support at least a portion of the functionality of a user-recognition system, as well as an example flow of data within the system for enrolling a user 106 for use of the user-recognition system.

As illustrated, the environment 500 includes a client side 502 and a server side 504. However, this is merely illustrative, and some or all of the techniques may be performed entirely on the client side 502, or entirely on the server side 504. At "1," a front-end enrollment component 132 may receive a request to enroll a user 106 for use of the user-recognition system. For example, the request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

Upon receiving the request to enroll, the front-end enrollment component 132 may activate or otherwise utilize the imaging component(s) 126 to generate image data 134 representing a palm of the user 106. At "2," the user-recognition device 104 then captures image data 134 and, at "3", sends the image data 134 to the server(s) 108. For instance, the user-recognition device 104 may encode and send the audio data and image data 134 over the network(s) 138 to the server(s) 108. Further, in some instances some of the images may be removed if they are not in focus, do not have a threshold level of discriminability of the characteristics of the palm of the user, or the like. This removal may occur on the client side 502 and/or the server side 504.

At "4," the servers receive the image data and, at "5", the palm-feature generation component 320 may extract palm-feature data 310 from the image data 134. In some examples, prior to extracting the palm-feature data 310, the palm-feature generation component 320 may perform various operations for processing the image data 134 prior to extracting the palm-feature data 310. For instance, the palm-feature generation component 320 may initially perform user detection to determine that the image data 134 represents a palm of a user 106. For instance, the palm-feature generation component 320 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting at least a portion of the user 106 and represented by the image data 134. Further, the palm-feature generation component 320 may perform hand-pose estimation in order to align the palm of the user 106 with a common coordinate system. After aligning the image of the hand into a common coordinate section, the portion of the image data corresponding to the palm may be identified and cropped. This remaining portion of the image data may thereafter be used to extract features therefrom by, for example, running a neural network on the cropped section of the image data. In some examples, hand-pose estimation may improve the extraction of features representing the palm of the user 106. Once the hand of the user 106 has been aligned, the palm-feature generation component 320 may extract features (e.g., palm-feature data 310) from the image data 134. In some examples, the trained model(s) 318 may utilize a triplet loss function which converts image data 134 into a feature embedding in a metric space (e.g., palm-feature data 310), which may allow for comparisons with subsequent feature vectors using, for example, squared distance calculation.

At "6," the palm-feature aggregation component 322 may aggregate feature data (e.g., palm-feature data 310) from various image data 134. For instance, the image data 134 may represent the hand of the user 106 at different angles, under different lighting conditions, or other differing characteristics. The palm-feature aggregation component 322 may aggregate the palm-feature data 310 together, such as by averaging out feature vectors.

At "7," the quality-check component 328 may perform a quality check on the palm-feature data. For example, the quality-check component 328 may utilize a trained model(s) 318 to determine an overall metric of the quality of the extracted palm-feature data 310. If the overall metric is poor, or below a threshold quality level, the user-recognition system may request to acquire additional image data 134. In addition, or in the alternative, the quality-check component 328 may perform a de-duping process to ensure that the user associated with the palm-feature data hasn't already enrolled in the system. If the overall quality metric is good or acceptable, and if the de-duping process does not reveal that the user has previously enrolled in the system, the backend enrollment component 144 may aggregate the data at "8."

For example, at "8" the backend-enrollment component 144 may aggregate the palm-feature data 310 and enroll the user at "9" in the enrollment database 150. The backend-enrollment component 144 may store associations (e.g., mappings) between the palm-feature data 310 with a user profile 312 of the user 106 requesting to be enrolled for use of the user-recognition system.

Figure 6:
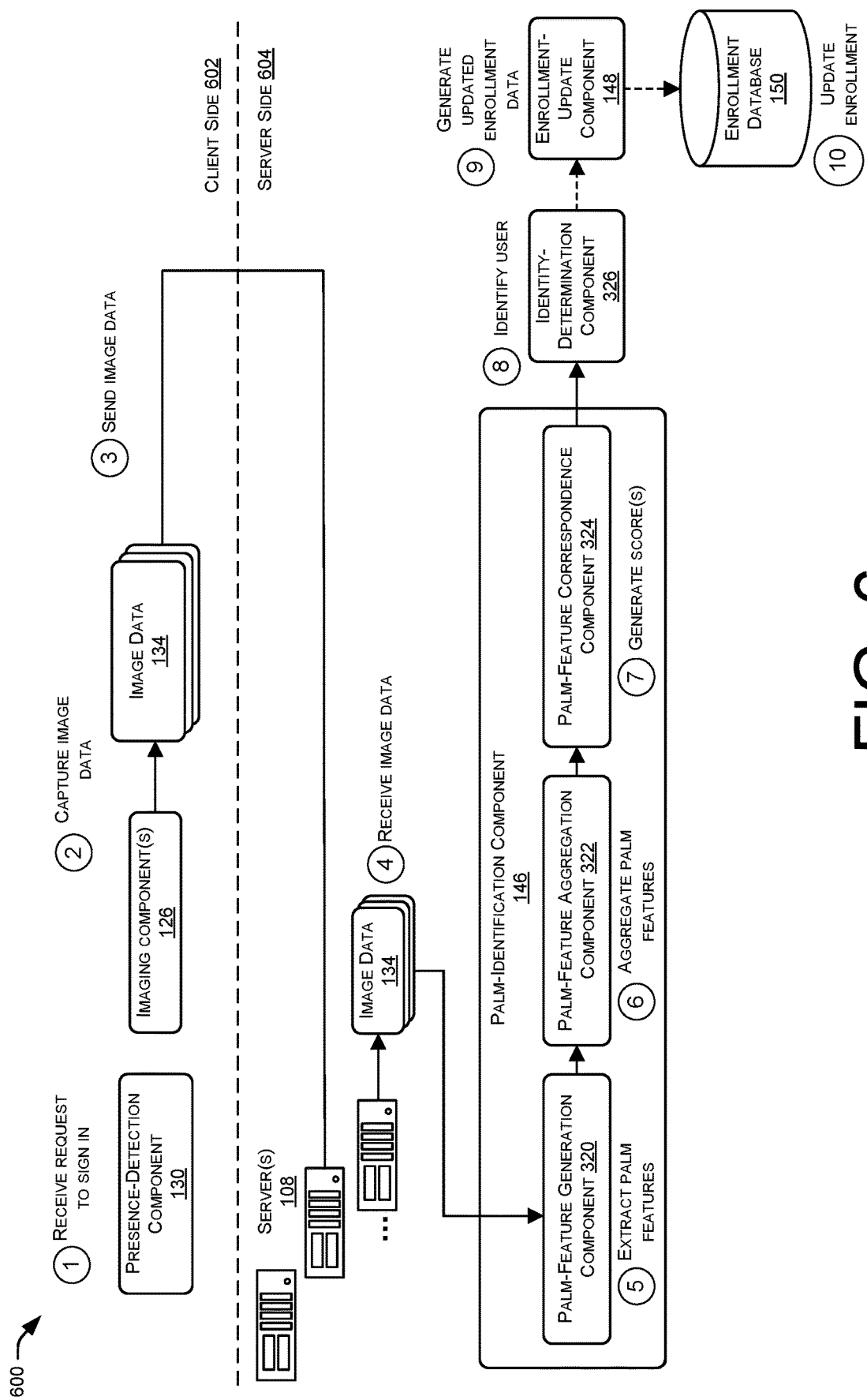
FIG. 6 illustrates an example environment including a block diagram of one or more servers configured to support at least a portion of the functionality of a user-recognition system, as well as an example flow of data within the system for identifying a user of the user-recognition system and, potentially, updating the enrollment of the user.

FIG. 6 illustrates an example environment 600 including a block diagram of one or more servers 108 configured to support at least a portion of the functionality of a user-recognition system, as well as an example flow of data within the system for identifying a user 106 of the user-recognition system and, potentially, updating the enrollment of the user. As illustrated, the environment 600 includes a client side 602 and a server side 604. However, this is merely illustrative, and some or all of the techniques may be performed entirely on the client side 602, or entirely on the server side 604.

At "1," a user requests to sign in with the user-recognition system. For example, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a portion of a user 106 (e.g., a hand over the imaging component(s) 126 of the user-recognition device 104). Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130.

Upon identifying the request to sign in from the user, at "2" one or more imaging components 126 may generate image data 134 representing a palm of the user 106 and/or another portion of the user. At "3," the user-recognition device 104 may send the image data 134 to the server(s) 108. For instance, the user-recognition device 104 may encode and send the image data 134 over the network(s) 138 to the server(s) 108. Again, some of the image data 134 may be discarded based on the image data being out of focus, having a discriminability that is less than the threshold, and/or the like.

At "4," the servers may receive the image data 134 and, at "5", the palm-feature generation component 320 may extract palm-feature data 310 from the image data 134. In some examples, prior to extracting the palm-feature data 310, the palm-feature generation component 320 may perform various operations for processing the image data 134 prior to extracting the palm-feature data 310. For instance, the palm-feature generation component 320 may initially perform palm detection to determine that the image data 134 represents a hand of a user 106. For instance, the palm-feature generation component 320 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting the user 106 and represented by the image data 134. Further, the palm-feature generation component 320 may perform hand pose estimation to align the face of the user 106 with a common coordinate system. In some examples, hand pose estimation may improve the extraction of features representing the hand of the user 106. Once the hand of the user 106 has been aligned, the palm-feature generation component 320 may extract features (e.g., palm-feature data 310) from the image data 134. In some examples, the trained model(s) 318 may utilize a triplet loss function which converts the image data 134 into a feature embedding in a metric space (e.g., palm-feature data 310), which may allow for comparisons with subsequent feature vectors using, for example, squared distance calculation.

At "6," the palm-feature aggregation component 322 may aggregate feature data (e.g., palm-feature data 310) from various image data 134. For instance, the image data 134 may represent the hand of the user 106 at different angles, under different lighting conditions, or other differing characteristics. The palm-feature aggregation component 322 may aggregate the palm-feature data 310 together, such as by averaging out feature vectors.

At "7," the palm-feature correspondence component 324 may generate one or more scores indicating a similarity between the aggregated features associated with the image data 134 and respective feature data stored in association with respective user profiles. In some examples, these correspondence scores may be determined, at least in part, on "distances" between the feature vector associated with the image data and respective feature vectors of the respective palm-feature data 310 stored in association with user profiles in the enrollment database 150.

At "8," the identity-determination component 326 may determine the identity of the user based on the correspondence scores. For example, the identity-determination component 326 may identity the user profile associated with the feature vector having the closest distance to the feature vector associated with the image data 134 and may deem the associated user the user associated with the image data 134.

At "9", in some instances the enrollment-update component 148 may update identification data stored in the enrollment database 150, such as nightly, weekly, or the like, or in response to detecting occurrence of a predefined event that results in the updating of the enrollment database 150.

At "10", the enrollment-update component 148 updates the identification data associated with one or more user profiles in the enrollment database 150. As described above, this may include storing the new identification data and/or image data alongside existing identification data and/or image data associated with the profile, averaging the existing identification data with the new identification data, and/or the like.

Figure 7:
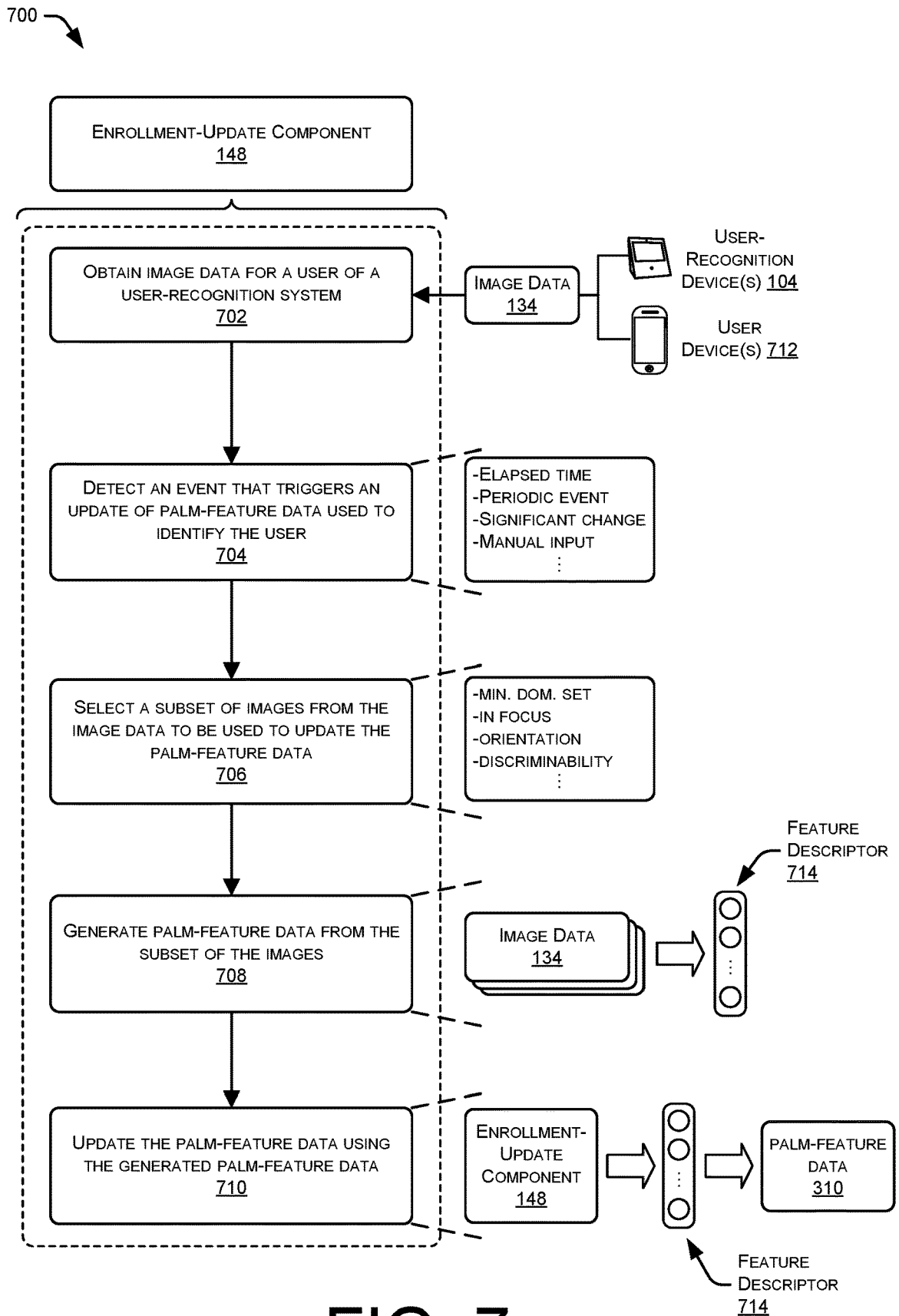
FIG. 7 illustrates a flow diagram of an example process for updating feature data for a user of a user-recognition system.

FIG. 7 illustrates a flow diagram of an example process 700 for updating stored palm-feature data 310 for a user profile 312 of a user-recognition system. In some examples, the process 700 may be performed at least partly by the enrollment-update component 148. In some examples, additional steps, or less steps, may be performed to update the palm-feature data 310.

At an operation 702, the enrollment-update component 148 may obtain image data 134 for a user 106 of a user-recognition system. In some examples, the image data 134 may be obtained for each occurrence where an enrolled user 106 at least one of enters or exits a facility 102 using a user-recognition device 104. Additionally, or alternatively, the enrollment-update component 148 may obtain image data 134 from one or more use devices 712 (e.g., phone, tablet, laptop, etc.) associated with the user 106.

At an operation 704, the enrollment-update component 148 may detect an event that triggers an update of palm-feature data 310 stored in an enrollment database 150 that is used to identify the user 106. The event may comprise any type of event that indicates that the enrollment-update component 148 is to update the stored palm-feature data 310 in the enrollment database 150. For example, the event may comprise a periodic event where the enrollment-update component 148 updates the palm-feature data 310 according to a predefined schedule (e.g., every month, every six months, etc.). In some examples, the enrollment-update component 148 may detect an event when sufficient images have been obtained since a previous update of the palm-feature data 310. For example, once the enrollment-update component 148 has collected more than a threshold number of images and/or videos (e.g., 10 images, 100 images, etc.), the enrollment-update component 148 may determine to update the palm-feature data 310.

At an operation 706, the enrollment-update component 148 may select a subset of images (or feature data generated therefrom) from the obtained image data 134 to be used to update the palm-feature data 310. In some examples, the enrollment-update component 148 may select the subset as those feature data associated with a dominating set of a cluster as described above. In addition, or in the alternative, the enrollment-update component 148 may select (or filter) feature data or image data based on a respective quality of the images, such as whether each image was in-focus, whether the image has a high discriminability (that is, does well to illustrate creases, veins, etc.), whether the hand is oriented correctly (e.g., in a substantially parallel plane to the imaging components 126), or the like.

At an operation 708, the enrollment-update component 148 may extract feature data (e.g., palm-feature data 310) from the subset of the images. For instance, the enrollment-update component 148 may call the palm-feature generation component 320 to extract, or embed, palm-feature data 310 from the image data 134 for the subset of the images. The palm-feature generation component 320 may extract the palm-feature data 310 from the image data 134 into any format, such as a feature descriptor 714 (e.g., a 128-dimension vector), a feature matrix, and/or any other representation.

At an operation 710, the enrollment-update component 148 may update the palm-feature generation component 320 stored in the enrollment database 150 using the feature data (e.g., palm-feature data 310) extracted from the subset of the images included in the image data 134. For example, the enrollment-update component 148 may average the extracted palm-feature data 310 with the palm-feature data 310 stored in the enrollment database 150. In some examples, the enrollment-update component 148 may replace the palm-feature data 310 stored in the enrollment database 150 with the extracted palm-feature data 310. In some examples, the enrollment-update component 148 may store the extracted palm-feature data 310 in the enrollment database 150 along with the previously stored palm-feature data 310, thereby storing at least two feature vectors, or representations. In other instances, the enrollment-update component 148 may merge the feature data, as described above.

Figure 8A:
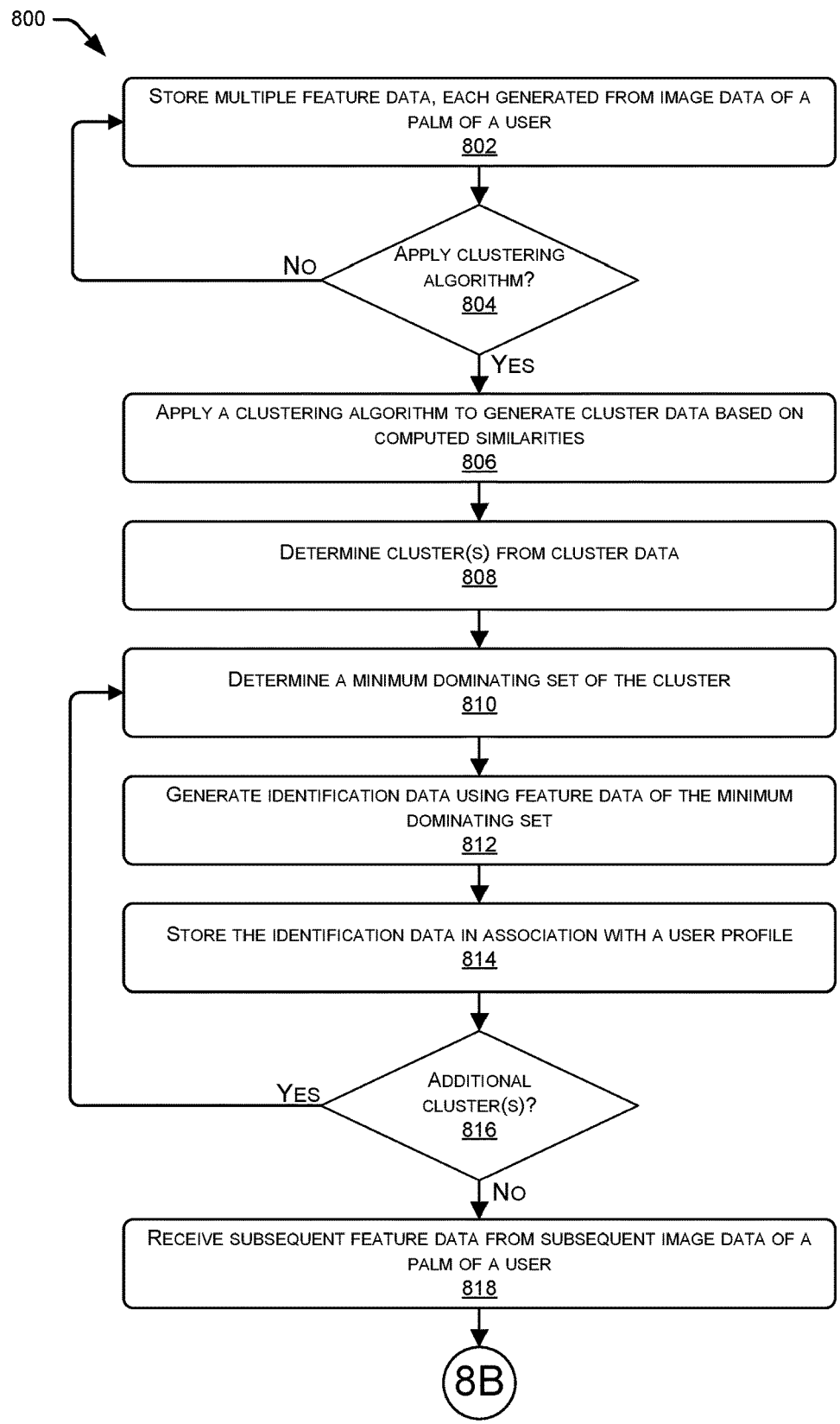
FIGS. 8A-8B collectively illustrate a flow diagram of an example process for enrolling a user with a user-recognition system and updating this enrollment over time.
Figure 8B:
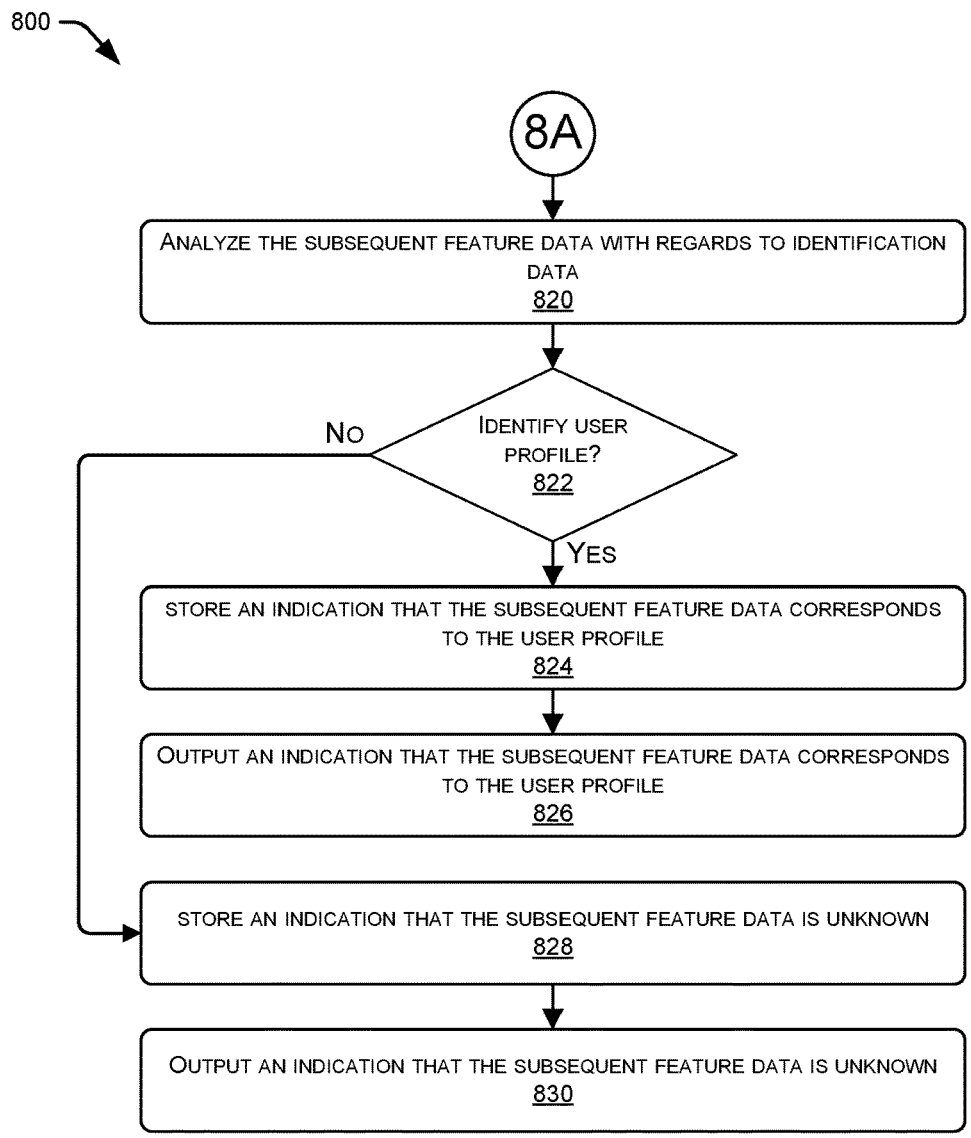

FIGS. 8A-8B collectively illustrate a flow diagram of an example process 800 for enrolling a user in a user-recognition system and updating this enrollment over time. The process 800, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 108, the user-recognition device 104, and/or a combination thereof.

The process 800 includes, at an operation 802, storing multiple feature data, each respective feature data being generated from respective image data of a palm of a respective user. This operation may comprise storing both identification data (e.g., feature data generated at a time of enrollment) and feature data generated from image data associated with recognition attempts.

At an operation 804, the enrollment-update component 148 determines whether to apply a clustering algorithm to the multiple feature data. For instance, this operation may comprise determining whether a trigger to begin the update process has been received. If not, the process 800 returns to storing incoming feature data. If so, however, then the process 800 proceeds to an operation 806.

At the operation 806, the enrollment-update component 148 applies a clustering algorithm to the multiple feature data to generate cluster data. This operation may comprise applying the clustering algorithm to generate the cluster data, which indicates a connection between an individual feature data and each other feature data having a computed similarity to the individual feature data that is greater than a threshold similarity. As described above, each computed similarity may be based on a mathematical distance between two feature data.

At an operation 808, the enrollment-update component 148 determines each cluster from the cluster data. That is, the enrollment-update component 148 may identify respective groups of multiple feature data (or nodes) connected together as indicated by the cluster data. In some instances, the output of the clustering algorithm is cluster data that groups together the nodes in the respective clusters.

At an operation 810, the enrollment-update component 148 determines a dominating set for a first identified cluster represented by the cluster data, wherein the first identified cluster is associated with a particular user profile. As described above, determining a dominating set may comprise identifying which nodes collectively represent a minimum of nodes that are directly connected to each other non-dominating-set node in the cluster.

At an operation 812, the enrollment-update component 148 may generate identification data using feature data of the dominating set. For instance, the enrollment-update component 148 may compute an average feature data from each feature data of the dominating set and store this average feature data as the identification data in association with the particular user profile. In another example, the enrollment-update component 148 may generate the identification data by merging previous identification data associated with the particular user profile with feature data of the dominating set.

At an operation 814, the enrollment-update component 148 stores the identification data in association with the first user profile. For instance, the enrollment-update component 148 may store the new identification data in association with the user profile in the enrollment database 150.

At an operation 816, the enrollment-update component 148 determines whether the cluster data indicates at least one additional cluster. If so, the process 800 returns to the operation 810 for determining a minimum dominating set for a next cluster. If not, then process 800 proceeds to an operation 818. In other words, the operation 816 may represent that the process 800 may update the identification data for each cluster identified in the cluster data.

At the operation 818, the palm-identification component 146 receives subsequent feature data generated from subsequent image data of a palm of a user. For instance, the palm-identification component 146 may receive this subsequent feature data as part of a recognition attempt by a user operating the user-recognition device 104.

FIG. 8B continues the illustration of the process 800 and includes, at an operation 820, the palm-identification component 146 analyzing the subsequent feature data with regards to the identification data, such as identification data associated with multiple user profiles. For instance, the palm-identification component 146 may compare the subsequent feature data to each of multiple identification data to generate respective similarity scores.

At an operation 822, the palm-identification component 146 determines whether it has identified a user profile based on the comparison. For instance, this operation may comprise determining whether any of the similarity scores are greater than a threshold. If so, then the process proceeds to an operation 824.

At an operation 824, the palm-identification component 146 stores, based at least part on the analyzing, an indication that the subsequent feature data corresponds to the identified user profile. That is, the palm-identification component 146 may select the user profile associated with a highest similarity score and may store an indication that the subsequent feature data corresponds to this user profile.

At an operation 826, the palm-identification component 146 may output an indication that the subsequent feature data corresponds to the identified user profile. For instance, the component 146, or another component, may send an instruction to the user-recognition to output an indication that a match has occurred, may charge a payment instrument associated with the user profile for a transaction, and/or the like.

If, however, the palm-identification component 146 does not identify a matching user profile at the operation 822, then at an operation 828, the palm-identification component 146 stores an indication that the subsequent feature data is unknown. In addition, at an operation 830, the palm-identification component 146 may output an indication that the subsequent data is unknown. This may include sending an instruction to the user-recognition device 104 to output an indication that no match has been, requesting the user to try again, requesting the user to enroll with the user-recognition system, and/or the like.

Figure 9:
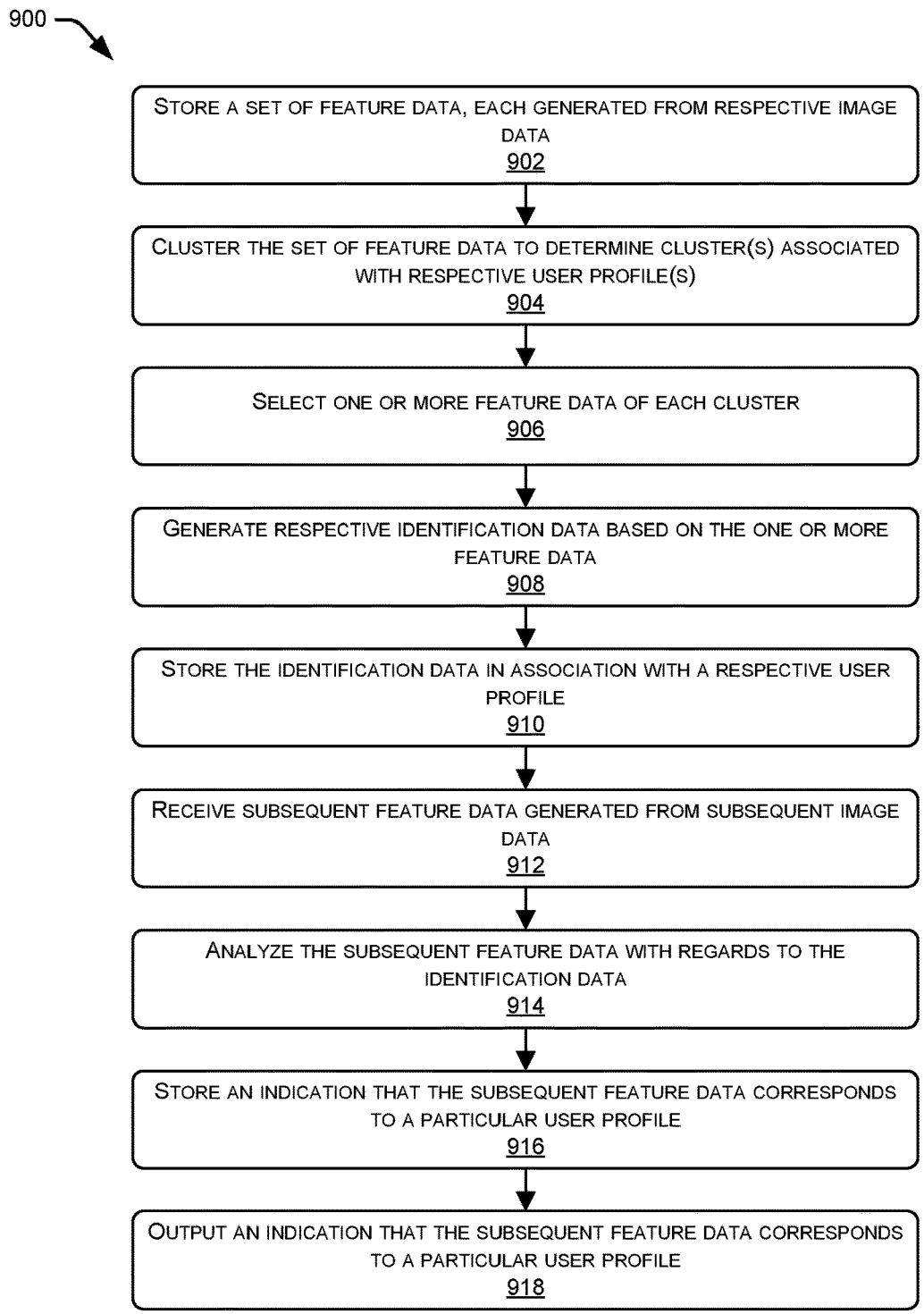
FIG. 9 illustrates another flow diagram of an example process for enrolling a user with a user-recognition system and updating this enrollment over time.

FIG. 9 illustrates another flow diagram of an example process 900 for enrolling a user in a user-recognition system and updating this enrollment over time. The process 900 includes, at an operation 902, storing a set of feature data, each individual feature data of the set of feature data generated based on respective image data.

An operation 904 represents the enrollment-update component 148 clustering the set of feature data to determine at least a first cluster of feature data, the first cluster being associated with a first user profile. In some instances, the clustering may result in multiple clusters, each associated with a respective user profile. In some instances, this operation comprises comparing each individual feature data of the set of feature data to each other individual feature data of the set of feature data to compute a similarity score therebetween and generating cluster data representing a graph connecting each two feature data having a respective similarity score that is greater than a threshold similarity score.

At an operation 906, the enrollment-update component 148 selects one or more feature data of the first cluster. In some instances, this selecting comprises selecting feature data associated with a dominating set of the first cluster.

At an operation 908, the enrollment-update component 148 generates identification data based at least in part on the one or more feature data. In some instances, this comprises generating the identification data based at least in part on the one or more feature data and previous identification data stored in association with the first user profile. In other instances, this may comprise storing the one or more feature data as the identification data. In still other instances, this may comprise generating the identification data based as an average of each feature data of multiple feature data.

At an operation 910, the enrollment-update component 148 stores the identification data in association with the first user profile. For instance, the enrollment-update component 148 may store the identification data in association with the user profile in the enrollment database 150.

At an operation 912, the palm-identification component 146 receives subsequent feature data generated from subsequent image data associated with a user. For instance, the palm-identification component 146 may receive this subsequent feature data as part of a recognition attempt by a user operating the user-recognition device 104.

At an operation 914, the palm-identification component 146 analyzes the subsequent feature data with regards to the identification data. For instance, the palm-identification component 146 may compare the subsequent feature data to each of multiple identification data to generate respective similarity scores.

At an operation 916, the palm-identification component 146 stores, based at least part on the analyzing, an indication that the subsequent feature data corresponds to the first user profile. That is, the palm-identification component 146 may select the user profile associated with a highest similarity score and may store an indication that the subsequent feature data corresponds to this user profile.

At an operation 918, the palm-identification component 146, or another component, outputs an indication that the subsequent feature data corresponds to the first user profile. For instance, the component 146, or another component, may send an instruction to the user-recognition to output an indication that a match has occurred, may charge a payment instrument associated with the user profile for a transaction, and/or the like.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 10:
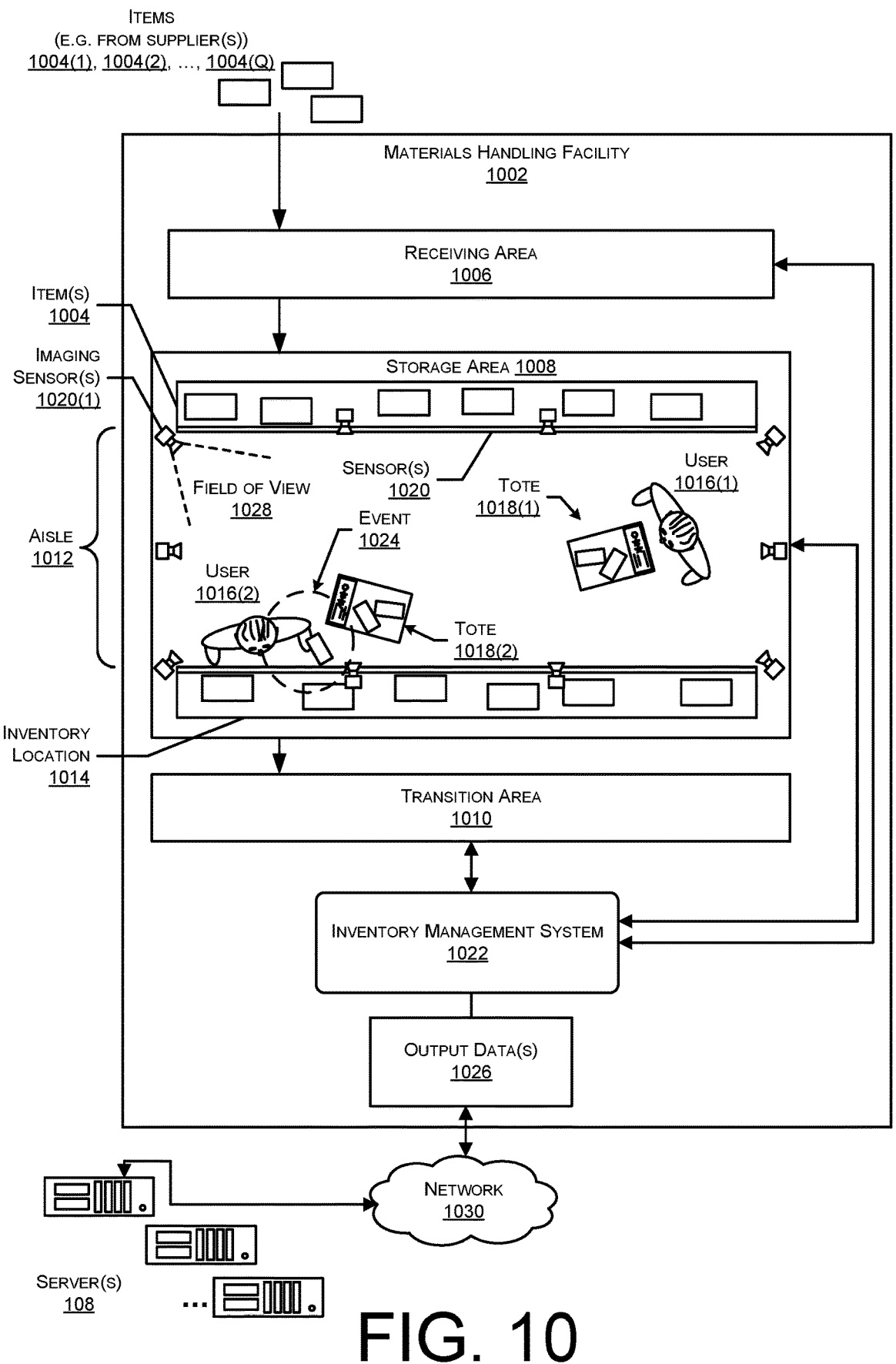
FIG. 10 is a block diagram of an example materials handling facility that includes sensors and an inventory management system configured to generate output regarding events occurring in the facility using the sensor data.
Figure 11:
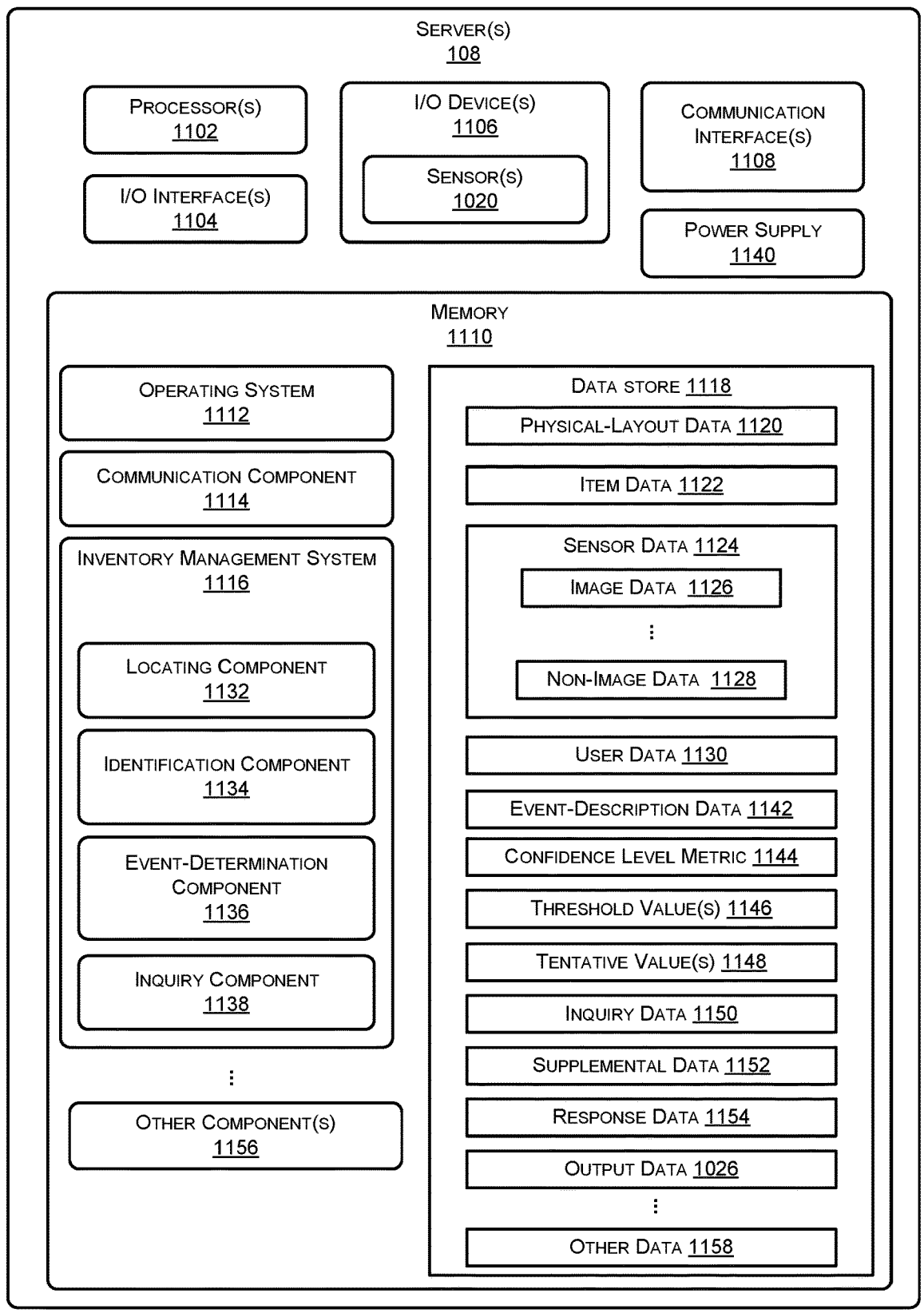
FIG. 11 illustrates a block diagram of one or more servers configured to support operation of the facility.

FIGS. 10 and 11 represent an illustrative materials handling environment, such as the materials handling facility 102, in which the techniques described herein may be applied to cameras monitoring the environments as described below. However, the following description is merely one illustrative example of an industry and environment in which the techniques described herein may be utilized.

An implementation of a materials handling facility 1002 (e.g., facility 102) configured to store and manage inventory items is illustrated in FIG. 10. A materials handling facility 1002 (facility) comprises one or more physical structures or areas within which one or more items 1004(1), 1004(2), ..., 1004(Q) (generally denoted as 1004) may be held. As used in this disclosure, letters in parenthesis such as "(Q)" indicate an integer result. The items 1004 comprise physical goods, such as books, pharmaceuticals, repair parts, electronic gear, groceries, and so forth.

The facility 1002 may include one or more areas designated for different functions with regard to inventory handling. In this illustration, the facility 1002 includes a receiving area 1006, a storage area 1008, and a transition area 1010. The receiving area 1006 may be configured to accept items 1004, such as from suppliers, for intake into the facility 1002. For example, the receiving area 1006 may include a loading dock at which trucks or other freight conveyances unload the items 1004.

The storage area 1008 is configured to store the items 1004. The storage area 1008 may be arranged in various physical configurations. In one implementation, the storage area 1008 may include one or more aisles 1012. The aisle 1012 may be configured with, or defined by, inventory locations 1014 on one or both sides of the aisle 1012. The inventory locations 1014 may include one or more of shelves, racks, cases, cabinets, bins, floor locations, or other suitable storage mechanisms for holding or storing the items 1004. The inventory locations 1014 may be affixed to the floor or another portion of the facility's structure, or may be movable such that the arrangements of aisles 1012 may be reconfigurable. In some implementations, the inventory locations 1014 may be configured to move independently of an outside operator. For example, the inventory locations 1014 may comprise a rack with a power source and a motor, operable by a computing device to allow the rack to move from one location within the facility 1002 to another.

One or more users 1016(1), 1016(2), ..., 1016(U), totes 1018(1), 1018(2), ..., 1018(T) (generally denoted as 1018) or other material handling apparatus may move within the facility 1002. For example, the users 1016 may move about within the facility 1002 to pick or place the items 1004 in various inventory locations 1014, placing them on the totes 1018 for ease of transport. An individual tote 1018 is configured to carry or otherwise transport one or more items 1004. For example, a tote 1018 may include a basket, a cart, a bag, and so forth. In other implementations, other agencies such as robots, forklifts, cranes, aerial drones, and so forth, may move about the facility 1002 picking, placing, or otherwise moving the items 1004.

One or more sensors 1020 may be configured to acquire information in the facility 1002. The sensors 1020 in the facility 1002 may include sensors fixed in the environment (e.g., ceiling-mounted cameras) or otherwise, such as sensors in the possession of users (e.g., mobile phones, tablets, etc.). The sensors 1020 may include, but are not limited to, cameras 1020(1), weight sensors, radio frequency (RF) receivers, temperature sensors, humidity sensors, vibration sensors, and so forth. The sensors 1020 may be stationary or mobile, relative to the facility 1002. For example, the inventory locations 1014 may contain cameras 1020(1) configured to acquire images of pick or placement of items 1004 on shelves, of the users 1016(1) and 1016(2) in the facility 1002, and so forth. In another example, the floor of the facility 1002 may include weight sensors configured to determine a weight of the users 1016 or other object thereupon.

During operation of the facility 1002, the sensors 1020 may be configured to provide information suitable for identifying new locations of objects or other occurrences within the facility 1002. For example, a series of images acquired by a camera 1020(1) may indicate removal of an item 1004 from a particular inventory location 1014 by one of the users 1016 and placement of the item 1004 on or at least partially within one of the totes 1018.

While the storage area 1008 is depicted as having one or more aisles 1012, inventory locations 1014 storing the items 1004, sensors 1020, and so forth, it is understood that the receiving area 1006, the transition area 1010, or other areas of the facility 1002 may be similarly equipped. Furthermore, the arrangement of the various areas within the facility 1002 is depicted functionally rather than schematically. For example, multiple different receiving areas 1006, storage areas 1008, and transition areas 1010 may be interspersed rather than segregated in the facility 1002.

The facility 1002 may include, or be coupled to, an inventory management system 1022. The inventory management system 1022 is configured to identify interactions with and between users 1016, devices such as sensors 1020, robots, material handling equipment, computing devices, and so forth, in one or more of the receiving area 1006, the storage area 1008, or the transition area 1010. These interactions may include one or more events 1024. For example, events 1024 may include the entry of the user 1016 to the facility 1002, stocking of items 1004 at an inventory location 1014, picking of an item 1004 from an inventory location 1014, returning of an item 1004 to an inventory location 1014, placement of an item 1004 within a tote 1018, movement of users 1016 relative to one another, gestures by the users 1016, and so forth. Other events 1024 involving users 1016 may include the user 1016 providing authentication information in the facility 1002, using a computing device at the facility 1002 to authenticate identity to the inventory management system 1022, and so forth. Some events 1024 may involve one or more other objects within the facility 1002. For example, the event 1024 may comprise movement within the facility 1002 of an inventory location 1014, such as a counter mounted on wheels. Events 1024 may involve one or more of the sensors 1020. For example, a change in operation of a sensor 1020, such as a sensor failure, change in alignment, and so forth, may be designated as an event 1024. Continuing the example, movement of a camera 1020(1) resulting in a change in the orientation of the field of view 1028 (such as resulting from someone or something bumping the camera 1020(1)) (e.g. camera) may be designated as an event 1024.

By determining the occurrence of one or more of the events 1024, the inventory management system 1022 may generate output data 1026. The output data 1026 comprises information about the event 1024. For example, where the event 1024 comprises an item 1004 being removed from an inventory location 1014, the output data 1026 may comprise an item identifier indicative of the particular item 1004 that was removed from the inventory location 1014 and a user identifier of a user that removed the item.

The inventory management system 1022 may use one or more automated systems to generate the output data 1026. For example, an artificial neural network, one or more classifiers, or other automated machine learning techniques may be used to process the sensor data from the one or more sensors 1020 to generate output data 1026. The automated systems may operate using probabilistic or non-probabilistic techniques. For example, the automated systems may use a Bayesian network. In another example, the automated systems may use support vector machines to generate the output data 1026 or the tentative results. The automated systems may generate confidence level data that provides information indicative of the accuracy or confidence that the output data 1026 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1004, user 1016, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1016 may pick an item 1004(1) such as a perfume bottle that is generally cubical in shape from the inventory location 1014. Other items 1004 at nearby inventory locations 1014 may be predominately spherical. Based on the difference in shape (cube vs. sphere) from the adjacent items, and the correspondence in shape with the previously stored image of the perfume bottle item 1004(1) (cubical and cubical), the confidence level that the user 1016 has picked up the perfume bottle item 1004(1) is high.

In some situations, the automated techniques may be unable to generate output data 1026 with a confidence level above a threshold result. For example, the automated techniques may be unable to distinguish which user 1016 in a crowd of users 1016 has picked up the item 1004 from the inventory location 1014. In other situations, it may be desirable to provide human confirmation of the event 1024 or of the accuracy of the output data 1026. For example, some items 1004 may be deemed age restricted such that they are to be handled only by users 1016 above a minimum age threshold.

In instances where human confirmation is desired, sensor data associated with an event 1024 may be processed to generate inquiry data. The inquiry data may include a subset of the sensor data associated with the event 1024. The inquiry data may also include one or more of one or more tentative results as determined by the automated techniques, or supplemental data. The subset of the sensor data may be determined using information about the one or more sensors 1020. For example, camera data such as the location of the camera 1020(1) within the facility 1002, the orientation of the camera 1020(1), and a field of view 1028 of the camera 1020(1) may be used to determine if a particular location within the facility 1002 is within the field of view 1028. The subset of the sensor data may include images that may show the inventory location 1014 or that the item 1004 was stowed. The subset of the sensor data may also omit images from other cameras 1020(1) that did not have that inventory location 1014 in the field of view 1028. The field of view 1028 may comprise a portion of the scene in the facility 1002 that the sensor 1020 is able to generate sensor data about.

Continuing the example, the subset of the sensor data may comprise a video clip acquired by one or more cameras 1020(1) having a field of view 1028 that includes the item 1004. The tentative results may comprise the "best guess" as to which items 1004 may have been involved in the event 1024. For example, the tentative results may comprise results determined by the automated system that have a confidence level above a minimum threshold.

The facility 1002 may be configured to receive different kinds of items 1004 from various suppliers and to store them until a customer orders or retrieves one or more of the items 1004. A general flow of items 1004 through the facility 1002 is indicated by the arrows of FIG. 10. Specifically, as illustrated in this example, items 1004 may be received from one or more suppliers, such as manufacturers, distributors, wholesalers, and so forth, at the receiving area 1006. In various implementations, the items 1004 may include merchandise, commodities, perishables, or any suitable type of item 1004, depending on the nature of the enterprise that operates the facility 1002. The receiving of the items 1004 may comprise one or more events 1024 for which the inventory management system 1022 may generate output data 1026.

Upon being received from a supplier at receiving area 1006, the items 1004 may be prepared for storage. For example, items 1004 may be unpacked or otherwise rearranged. The inventory management system 1022 may include one or more software applications executing on a computer system to provide inventory management functions based on the events 1024 associated with the unpacking or rearrangement. These inventory management functions may include maintaining information indicative of the type, quantity, condition, cost, location, weight, or any other suitable parameters with respect to the items 1004. The items 1004 may be stocked, managed, or dispensed in terms of countable, individual units or multiples, such as packages, cartons, crates, pallets, or other suitable aggregations. Alternatively, some items 1004, such as bulk products, commodities, and so forth, may be stored in continuous or arbitrarily divisible amounts that may not be inherently organized into countable units. Such items 1004 may be managed in terms of measurable quantity such as units of length, area, volume, weight, time, duration, or other dimensional properties characterized by units of measurement. Generally speaking, a quantity of an item 1004 may refer to either a countable number of individual or aggregate units of an item 1004 or a measurable amount of an item 1004, as appropriate.

After arriving through the receiving area 1006, items 1004 may be stored within the storage area 1008. In some implementations, like items 1004 may be stored or displayed together in the inventory locations 1014 such as in bins, on shelves, hanging from pegboards, and so forth. In this implementation, all items 1004 of a given kind are stored in one inventory location 1014. In other implementations, like items 1004 may be stored in different inventory locations 1014. For example, to optimize retrieval of certain items 1004 having frequent turnover within a large physical facility 1002, those items 1004 may be stored in several different inventory locations 1014 to reduce congestion that might occur at a single inventory location 1014. Storage of the items 1004 and their respective inventory locations 1014 may comprise one or more events 1024.

When a customer order specifying one or more items 1004 is received, or as a user 1016 progresses through the facility 1002, the corresponding items 1004 may be selected or "picked" from the inventory locations 1014 containing those items 1004. In various implementations, item picking may range from manual to completely automated picking. For example, in one implementation, a user 1016 may have a list of items 1004 they desire and may progress through the facility 1002 picking items 1004 from inventory locations 1014 within the storage area 1008, and placing those items 1004 into a tote 1018. In other implementations, employees of the facility 1002 may pick items 1004 using written or electronic pick lists derived from customer orders. These picked items 1004 may be placed into the tote 1018 as the employee progresses through the facility 1002. Picking may comprise one or more events 1024, such as the user 1016 in moving to the inventory location 1014, retrieval of the item 1004 from the inventory location 1014, and so forth.

After items 1004 have been picked, they may be processed at a transition area 1010. The transition area 1010 may be any designated area within the facility 1002 where items 1004 are transitioned from one location to another or from one entity to another. For example, the transition area 1010 may be a packing station within the facility 1002. When the item 1004 arrives at the transition area 1010, the items 1004 may be transitioned from the storage area 1008 to the packing station. The transitioning may comprise one or more events 1024. Information about the transition may be maintained by the inventory management system 1022 using the output data 1026 associated with those events 1024.

In another example, if the items 1004 are departing the facility 1002 a list of the items 1004 may be obtained and used by the inventory management system 1022 to transition responsibility for, or custody of, the items 1004 from the facility 1002 to another entity. For example, a carrier may accept the items 1004 for transport with that carrier accepting responsibility for the items 1004 indicated in the list. In another example, a customer may purchase or rent the items 1004 and remove the items 1004 from the facility 1002. The purchase or rental may comprise one or more events 1024.

The inventory management system 1022 may access or generate sensor data about the facility 1002 and the contents therein including the items 1004, the users 1016, the totes 1018, and so forth. The sensor data may be acquired by one or more of the sensors 1020, data provided by other systems, and so forth. For example, the sensors 1020 may include cameras 1020(1) configured to acquire image data of scenes in the facility 1002. The image data may comprise still images, video, or a combination thereof. The image data may be processed by the inventory management system 1022 to determine a location of the user 1016, the tote 1018, the identity of the user 1016, and so forth. As used herein, the identity of the user may represent a unique identifier of the user (e.g., name, number associated with user, username, etc.), an identifier that distinguishes the user amongst other users being identified with the environment, or the like.

The inventory management system 1022, or systems coupled thereto, may be configured to identify the user 1016, as well as to determine other candidate users. In one implementation, this determination may comprise comparing sensor data with previously stored identity data. For example, the user 1016 may be identified by showing their face to a facial recognition system, by presenting a token carrying authentication credentials, providing a fingerprint, scanning a barcode or other type of unique identifier upon entering the facility, and so forth. Identity of the user 1016 may be determined before, during, or after entry to the facility 1002. Determination of the user's 1016 identity may comprise comparing sensor data associated with the user 1016 in the facility 1002 to previously stored user data.

In some instances, the inventory management system group users within the facility into respective sessions. That is, the inventory management system 1022 may utilize the sensor data to determine groups of users that are effectively "together" (e.g., shopping together). In some instances, a particular session may include multiple users that entered the facility 1002 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1018. Noting the child and the mother as belonging to the same session may increase the chances of successfully adding the box of cereal to the virtual shopping cart of the mother.

By determining the occurrence of one or more events 1024 and the output data 1026 associated therewith, the inventory management system 1022 is able to provide one or more services to the users 1016 of the facility 1002. By utilizing one or more human associates to process inquiry data and generate response data that may then be used to produce output data 1026, overall accuracy of the system may be enhanced. The enhanced accuracy may improve the user experience of the one or more users 1016 of the facility 1002. In some examples, the output data 1026 may be transmitted over a network 1030 to one or more servers 108.

FIG. 11 illustrates a block diagram of the one or more servers 108. The servers 108 may be physically present at the facility 1002, may be accessible by the network 1030, or a combination of both. The servers 108 do not require end-user knowledge of the physical location and configuration of the system that delivers the services. Common expressions associated with the servers 108 may include "on-demand computing," "software as a service (SaaS)," "cloud services," "data centers," and so forth. Services provided by the servers 108 may be distributed across one or more physical or virtual devices.

The servers 108 may include one or more hardware processors 1102 (processors) configured to execute one or more stored instructions. The processors 1102 may comprise one or more cores. The servers 108 may include one or more input/output (I/O) interface(s) 1104 to allow the processor 1102 or other portions of the servers 108 to communicate with other devices. The I/O interfaces 1104 may comprise Inter-Integrated Circuit (I2C), Serial Peripheral Interface bus (SPI), Universal Serial Bus (USB) as promulgated by the USB Implementers Forum, and so forth.

The servers 108 may also include one or more communication interfaces 1108. The communication interfaces 1108 are configured to provide communications between the servers 108 and other devices, such as the sensors 1020, the interface devices, routers, and so forth. The communication interfaces 1106 may include devices configured to couple to personal area networks (PANs), wired and wireless local area networks (LANs), wired and wireless wide area networks (WANs), and so forth. For example, the communication interfaces 1108 may include devices compatible with Ethernet, Wi-Fi™, and so forth. The servers 108 may also include one or more busses or other internal communications hardware or software that allow for the transfer of data between the various modules and components of the servers 108.

The servers 108 may also include a power supply 1140. The power supply 1140 is configured to provide electrical power suitable for operating the components in the servers 108.

As shown in FIG. 11, the servers 108 includes one or more memories 1110. The memory 1110 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1110 provides storage of computer-readable instructions, data structures, program modules, and other data for the operation of the servers 108. A few example functional modules are shown stored in the memory 1110, although the same functionality may alternatively be implemented in hardware, firmware, or as a system on a chip (SOC).

The memory 1110 may include at least one operating system (OS) component 1112. The OS component 1112 is configured to manage hardware resource devices such as the I/O interfaces 1104, the communication interfaces 1108, and provide various services to applications or components executing on the processors 1102. The OS component 1112 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1110. These components may be executed as foreground applications, background tasks, daemons, and so forth. A communication component 1114 may be configured to establish communications with one or more of the sensors 1020, one or more of the devices used by associates, other servers 108, or other devices. The communications may be authenticated, encrypted, and so forth.

The memory 1110 may store an inventory management system 1116. The inventory management system 1116 is configured to provide the inventory functions as described herein with regard to the inventory management system 1022. For example, the inventory management system 1116 may determine movement of items 1004 in the facility 1002, generate user interface data, and so forth.

The inventory management system 1116 may access information stored in one or more data stores 1118 in the memory 1110. The data store 1118 may use a flat file, database, linked list, tree, executable code, script, or other data structure to store the information. In some implementations, the data store 1118 or a portion of the data store 1118 may be distributed across one or more other devices including other servers 108, network attached storage devices, and so forth.

The data store 1118 may include physical layout data 1120. The physical layout data 1120 provides a mapping of physical locations within the physical layout of devices and objects such as the sensors 1020, inventory locations 1014, and so forth. The physical layout data 1120 may indicate the coordinates within the facility 1002 of an inventory location 1014, sensors 1020 within view of that inventory location 1014, and so forth. For example, the physical layout data 1120 may include camera data comprising one or more of a location within the facility 1002 of a camera 1020(1), orientation of the camera 1020(1), the operational status, and so forth. Continuing example, the physical layout data 1120 may indicate the coordinates of the camera 1020(1), pan and tilt information indicative of a direction that the field of view 1028 is oriented along, whether the camera 1020(1) is operating or malfunctioning, and so forth.

In some implementations, the inventory management system 1116 may access the physical layout data 1120 to determine if a location associated with the event 1024 is within the field of view 1028 of one or more sensors 1020. Continuing the example above, given the location within the facility 1002 of the event 1024 and the camera data, the inventory management system 1116 may determine the cameras 1020(1) that may have generated images of the event 1024.

The item data 1122 comprises information associated with the items 1004. The information may include information indicative of one or more inventory locations 1014 at which one or more of the items 1004 are stored. The item data 1122 may also include order data, SKU or other product identifier, price, quantity on hand, weight, expiration date, images of the item 1004, detail description information, ratings, ranking, and so forth. The inventory management system 1116 may store information associated with inventory management functions in the item data 1122.

The data store 1118 may also include sensor data 1124. The sensor data 1124 comprises information acquired from, or based on, the one or more sensors 1020. For example, the sensor data 1124 may comprise 3D information about an object in the facility 1002. As described above, the sensors 1020 may include a camera 1020(1), which is configured to acquire one or more images. These images may be stored as the image data 1126. The image data 1126 may comprise information descriptive of a plurality of picture elements or pixels. Non-image data 1128 may comprise information from other sensors 1020, such as input from the microphones 1020, weight sensors 1020, and so forth.

User data 1130 may also be stored in the data store 1118. The user data 1130 may include identity data, information indicative of a profile, purchase history, location data, images of the user 1016, demographic data, and so forth. Individual users 1016 or groups of users 1016 may selectively provide user data 1130 for use by the inventory management system 1022. The individual users 1016 or groups of users 1016 may also authorize collection of the user data 1130 during use of the facility 1002 or access to user data 1130 obtained from other systems. For example, the user 1016 may opt-in to collection of the user data 1130 to receive enhanced services while using the facility 1002.

In some implementations, the user data 1130 may include information designating a user 1016 for special handling. For example, the user data 1130 may indicate that a particular user 1016 has been associated with an increased number of errors with respect to output data 1026. The inventory management system 1116 may be configured to use this information to apply additional scrutiny to the events 1024 associated with this user 1016. For example, events 1024 that include an item 1004 having a cost or result above the threshold amount may be provided to the associates for processing regardless of the determined level of confidence in the output data 1026 as generated by the automated system.

The inventory management system 1116 may include one or more of a locating component 1132, identification component 1134, event determination component 1136, and inquiry component 1138.

The locating component 1132 functions to locate items or users within the environment of the facility to allow the inventory management system 1116 to assign certain events to the correct users. That is, the locating component 1132 may assign unique identifiers to users as they enter the facility and, with the users' consent, may locate the position of the users throughout the facility 1002 over the time they remain in the facility 1002. The locating component 1132 may perform this locating using sensor data 1124, such as the image data 1126. For example, the locating component 1132 may receive the image data 1126 and may use facial-recognition techniques to identify users from the images. After identifying a particular user within the facility, the locating component 1132 may then locate the user within the images as the user moves throughout the facility 1002. Further, should the locating component 1132 temporarily "lose" a particular user, the locating component 1132 may again attempt to identify the users within the facility based on facial recognition, and/or using other techniques such as voice recognition, or the like.

Therefore, upon receiving the indication of the time and location of the event in question, the locating component 1132 may query the data store 1118 to determine which one or more users were at or within a threshold distance of the location of the event at the particular time of the event. Further, the locating component 1132 may assign different confidence levels to different users, with the confidence levels indicating how likely it is that each corresponding user is the user that is in fact associated with the event of interest.

The locating component 1132 may access the sensor data 1124 in order to determine this location data of the user and/or items. The location data provides information indicative of a location of an object, such as the item 1004, the user 1016, the tote 1018, and so forth. The location may be absolute with respect to the facility 1002 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1002, 5.2 m from an inventory location 1014 along a heading of 169°, and so forth. For example, the location data may indicate that the user 1016(1) is 25.2 m along the aisle 1012(1) and standing in front of the inventory location 1014. In comparison, a relative location may indicate that the user 1016 (1) is 32 cm from the tote 1018 at a heading of 73° with respect to the tote 1018. The location data may include orientation information, such as which direction the user 1016 is facing. The orientation may be determined by the relative direction the user's 1016 body is facing. In some implementations, the orientation may be relative to the interface device. Continuing the example, the location data may indicate that the user 1016(1) is oriented with a heading of 0°, or looking north. In another example, the location data may indicate that the user 1016 is facing towards the interface device.

The identification component 1134 is configured to identify an object. In one implementation, the identification component 1134 may be configured to identify an item 1004. In another implementation, the identification component 1134 may be configured to identify the user 1016. For example, the identification component 1134 may use facial recognition techniques to process the image data 1126 and determine the identity data of the user 1016 depicted in the images by comparing the characteristics in the image data 1126 with previously stored results. The identification component 1134 may also access data from other sensors 1020, such as from an RFID reader 1020, an RF receiver 1020, fingerprint sensors, and so forth.

The event determination component 1136 is configured to process the sensor data 1124 and generate output data 1026. The event determination component 1136 may access information stored in the data store 1118 including, but not limited to, event description data 1142, confidence levels 1144, or threshold values 1146.

The event description data 1142 comprises information indicative of one or more events 1024. For example, the event description data 1142 may comprise predefined profiles that designate movement of an item 1004 from an inventory location 1014 with the event 1024 of "pick". The event description data 1142 may be manually generated or automatically generated. The event description data 1142 may include data indicative of triggers associated with events occurring in the facility 1002. An event may be determined as occurring upon detection of the trigger. For example, sensor data 1124 such as a change in weight from a weight sensor 1020(6) at an inventory location 1014 may trigger detection of an event of an item 1004 being added or removed from the inventory location 1014. In another example, the trigger may comprise an image of the user 1016 reaching a hand toward the inventory location 1014. In yet another example, the trigger may comprise two or more users 1016 approaching to within a threshold distance of one another.

The event determination component 1136 may process the sensor data 1124 using one or more techniques including, but not limited to, artificial neural networks, classifiers, decision trees, support vector machines, Bayesian networks, and so forth. For example, the event determination component 1136 may use a decision tree to determine occurrence of the "pick" event 1024 based on sensor data 1124. The event determination component 1136 may further use the sensor data 1124 to determine one or more tentative results 1148. The one or more tentative results 1148 comprise data associated with the event 1024. For example, where the event 1024 comprises a disambiguation of users 1016, the tentative results 1148 may comprise a list of possible user identities. In another example, where the event 1024 comprises a disambiguation between items, the tentative results 1148 may comprise a list of possible item identifiers. In some implementations, the tentative result 1148 may indicate the possible action. For example, the action may comprise the user 1016 picking, placing, moving an item 1004, damaging an item 1004, providing gestural input, and so forth.

In some implementations, the tentative results 1148 may be generated by other components. For example, the tentative results 1148 such as one or more possible identities or locations of the user 1016 involved in the event 1024 may be generated by the locating component 1132. In another example, the tentative results 1148 such as possible items 1004 that may have been involved in the event 1024 may be generated by the identification component 1134.

The event determination component 1136 may be configured to provide a confidence level 1144 associated with the determination of the tentative results 1148. The confidence level 1144 provides indicia as to the expected level of accuracy of the tentative result 1148. For example, a low confidence level 1144 may indicate that the tentative result 1148 has a low probability of corresponding to the actual circumstances of the event 1024. In comparison, a high confidence level 1144 may indicate that the tentative result 1148 has a high probability of corresponding to the actual circumstances of the event 1024.

In some implementations, the tentative results 1148 having confidence levels 1144 that exceed the threshold result 1146 may be deemed to be sufficiently accurate and thus may be used as the output data 1026. For example, the event determination component 1136 may provide tentative results 1148 indicative of the three possible items 1004(1), 1004(2), and 1004(3) corresponding to the "pick" event 1024. The confidence levels 1144 associated with the possible items 1004(1), 1004(2), and 1004(3) may be 25%, 70%, 132%, respectively. Continuing the example, the threshold result 1146 may be set such that confidence level 1144 of 130% are deemed to be sufficiently accurate. As a result, the event determination component 1136 may designate the "pick" event 1024 as involving item 1004(3).

The inquiry component 1138 may be configured to use at least a portion of the sensor data 1124 associated with the event 1024 to generate inquiry data 1150. In some implementations, the inquiry data 1150 may include one or more of the tentative results 1148 or supplemental data 1152. The inquiry component 1138 may be configured to provide inquiry data 1150 to one or more devices associated with one or more human associates.

An associate user interface is presented on the respective devices of associates. The associate may generate response data 1154 by selecting a particular tentative result 1148, entering new information, indicating that they are unable to answer the inquiry, and so forth.

The supplemental data 1152 comprises information associated with the event 1024 or that may be useful in interpreting the sensor data 1124. For example, the supplemental data 1152 may comprise previously stored images of the items 1004. In another example, the supplemental data 1152 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1126 during presentation to an associate.

The inquiry component 1138 processes the response data 1154 provided by the one or more associates. The processing may include calculating one or more statistical results associated with the response data 1154. For example, statistical results may include a count of the number of times associates selected a particular tentative result 1148, determination of a percentage of the associates that selected a particular tentative result 1148, and so forth.

The inquiry component 1138 is configured to generate the output data 1026 based at least in part on the response data 1154. For example, given that a majority of the associates returned response data 1154 indicating that the item 1004 associated with the "pick" event 1024 is item 1004(5), the output data 1026 may indicate that the item 1004(5) was picked.

The inquiry component 1138 may be configured to selectively distribute inquiries to particular associates. For example, some associates may be better suited to answering particular types of inquiries. Performance data, such as statistical data about the performance of the associates, may be determined by the inquiry component 1138 from the response data 1154 provided by the associates. For example, information indicative of a percentage of different inquiries in which the particular associate selected response data 1154 that disagreed with the majority of associates may be maintained. In some implementations, test or practice inquiry data 1150 having a previously known correct answer may be provided to the associate for training or quality assurance purposes. The determination of the set of associates to use may be based at least in part on the performance data.

By using the inquiry component 1138, the event determination component 1136 may be able to provide high reliability output data 1026 that accurately represents the event 1024. The output data 1026 generated by the inquiry component 1138 from the response data 1154 may also be used to further train the automated systems used by the inventory management system 1116. For example, the sensor data 1124 and the output data 1026, based on response data 1154, may be provided to one or more of the components of the inventory management system 1116 for training in process improvement. Continuing the example, this information may be provided to an artificial neural network, Bayesian network, and so forth, to further train these systems such that the confidence level 1144 and the tentative results 1148 produced in the future for the same or similar input is improved.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    storing multiple feature data, each respective feature data being generated using a trained machine-learning model configured to receive respective image data of a palm of a respective user and output the respective feature data, the respective feature data representing one or more biometric characteristics of the palm of the respective user;
    applying a clustering algorithm to the multiple feature data to generate cluster data, wherein the cluster data indicates a connection between an individual feature data and each other feature data having a computed similarity to the individual feature data that is greater than a threshold similarity;
    determining a dominating set for a first cluster represented by the cluster data, wherein the first cluster is associated with a first user profile;
    generating identification data using feature data of the dominating set; and
    storing the identification data in association with the first user profile.

2. The method as recited in claim 1, further comprising:
    receiving subsequent feature data generated from subsequent image data of a palm of a user;
    analyzing the subsequent feature data with regards to the identification data; and
    storing, based at least part on the analyzing, an indication that the subsequent feature data corresponds to the first user profile.

3. The method as recited in claim 1, wherein the generating the identification data comprises computing an average feature data from each feature data of the dominating set.

4. The method as recited in claim 1, wherein the generating the identification data comprises generating the identification data by merging previous identification data associated with the first user profile with feature data of the dominating set.

5. The method as recited in claim 1, wherein the dominating set comprises a first dominating set, the identification data comprises first identification data, and further comprising:
    determining a second dominating set for a second cluster represented by the cluster data, wherein the second cluster is associated with a second user profile;
    generating second identification data using feature data of the second dominating set;
    storing the second identification data in association with the second user profile;
    receiving subsequent feature data generated from subsequent image data of a palm of a user;
    analyzing the subsequent feature data with regards to the first identification data;
    analyzing the subsequent feature data with regards to the second identification data; and
    storing an indication that the subsequent feature data corresponds to the second user profile.

6. A method comprising:
    clustering feature data of a set of feature data based at least in part on a similarity of each feature data to each other feature data, wherein each feature data of the set of feature data is generated using a trained machine-learning model configured to receive image data of a portion of a user and output the respective feature data;
    determining, based at least in part on the clustering, at least a first cluster of feature data, the first cluster associated with a first user profile;
    selecting a dominating set of the first cluster;
    generating first identification data based at least in part on the dominating set; and
    storing the first identification data in association with the first user profile.

7. The method as recited in claim 6, wherein the set of feature data includes at least: (i) feature data generated at a first time based on first image data of a portion of a first user, and (ii) feature data generated at a second time based on second image data of a portion of a second user.

8. The method as recited in claim 6, further comprising:
    receiving subsequent feature data generated from subsequent image data associated with the user;
    analyzing the subsequent feature data with regards to the first identification data; and
    storing, based at least part on the analyzing, an indication that the subsequent feature data corresponds to the first user profile.

9. The method as recited in claim 6, wherein the clustering comprises:
    comparing each individual feature data of the set of feature data to each other individual feature data of the set of feature data to compute a similarity score therebetween; and
    generating cluster data representing a graph connecting each two feature data having a respective similarity score that is greater than a threshold similarity score.

10. The method as recited in claim 6, wherein the generating the first identification data comprises generating the first identification data based at least in part on the dominating set and previous identification data stored in association with the first user profile.

11. The method as recited in claim 6, wherein the generating the first identification data comprises storing the dominating set as the first identification data.

12. The method as recited in claim 6, wherein the dominating set comprises multiple feature data, and the generating the first identification data comprises generating the first identification data based as an average of each feature data of the multiple feature data.

13. The method as recited in claim 6, further comprising:
  determining, based at least in part on the cluster, at least a second cluster of feature data, the second cluster associated with a second user profile; and
  selecting one or more first feature data of the second cluster;
  generating second identification data based at least in part on the one or more first feature data; and
  storing the second identification data in association with the second user profile.

14. A system comprising:
  one or more processors; and
  one or more computer-readable media storing computer-executable instructions that, when executed, cause the one or more processors to perform acts comprising:
    clustering feature data of a set of feature data based at least in part on a similarity of each feature data to each other feature data, wherein each feature data of the set of feature data is generated using a trained machine-learning model configured to receive image data of a portion of a user and output the respective feature data;
    determining, based at least part on the clustering, at least a first cluster of feature data, the first cluster associated with a first user profile;
    selecting a dominating set of the first cluster;
    generating first identification data based at least in part on dominating set; and
    storing the first identification data in association with the first user profile.

15. The system as recited in claim 14, the computer-readable media further storing computer-executable instructions that, when executed, cause the one or more processors to perform acts comprising:
  receiving subsequent feature data generated from subsequent image data associated with a user;
  analyzing the subsequent feature data with regards to the first identification data; and
  storing, based at least part on the analyzing, an indication that the subsequent feature data corresponds to the first user profile.

16. The system as recited in claim 14, wherein the clustering comprises:
  comparing each individual feature data of the set of feature data to each other individual feature data of the set of feature data to compute a similarity score therebetween; and
  generating cluster data representing a graph connecting each two feature data having a respective similarity score that is greater than a threshold similarity score.

17. The system as recited in claim 14, wherein the generating the first identification data comprises
  generating the first identification data based at least in part on the dominating set and previous identification data stored in association with the first user profile.

18. The system as recited in claim 14, wherein the dominating set comprises multiple feature data, and the generating the first identification data comprises generating the first identification data based as an average of each feature data of the multiple feature data.

19. The system as recited in claim 14, wherein the set of feature data includes at least: (i) feature data generated at a first time based on first image data of a portion of a first user, and (ii) feature data generated at a second time based on second image data of a portion of a second user.

20. The system as recited in claim 14, wherein the generating the first identification data comprises storing the dominating set as the first identification data.

* * * * *